(12) United States Patent
MacInnis et al.

(10) Patent No.: US 9,632,985 B1
(45) Date of Patent: Apr. 25, 2017

(54) SYSTEM AND METHODS FOR CROSS PLATFORM INTERACTIVE ELECTRONIC BOOKS

(75) Inventors: Charles M MacInnis, San Francisco, CA (US); Joshua John Forman, San Francisco, CA (US); Robert Cromwell, Seattle, WA (US); Kevin Ballard, San Francisco, CA (US); Peter S. Cho, San Francisco, CA (US); Anne K. Halsall, San Francisco, CA (US); Scott William Kyle, El Dorado Hills, CA (US)

(73) Assignee: INKLING SYSTEMS, INC., San Francisco, CA (US)

( * ) Notice: Subject to any disclaimer, the term of this patent is extended or adjusted under 35 U.S.C. 154(b) by 769 days.

(21) Appl. No.: 13/019,211

(22) Filed: Feb. 1, 2011

Related U.S. Application Data

(60) Provisional application No. 61/300,319, filed on Feb. 1, 2010.

(51) Int. Cl.
*G06F 17/21* (2006.01)
*G06F 9/44* (2006.01)
*G06F 3/048* (2013.01)

(52) U.S. Cl.
CPC ............ *G06F 17/212* (2013.01); *G06F 3/048* (2013.01); *G06F 8/38* (2013.01); *G06F 17/214* (2013.01)

(58) Field of Classification Search
CPC .... G06F 17/211; G06F 17/212; G06F 17/214; G06F 17/218; G06F 8/38; G06F 3/048
USPC .......................................... 434/350, 322–323
See application file for complete search history.

(56) References Cited

U.S. PATENT DOCUMENTS

| | | | | |
|---|---|---|---|---|
| 5,233,333 A * | 8/1993 | Borsuk | ......................... | 345/660 |
| 6,037,954 A * | 3/2000 | McMahon | .................... | 345/169 |
| 6,405,167 B1 * | 6/2002 | Cogliano | ..................... | 704/251 |
| 7,724,696 B1 * | 5/2010 | Parekh | ......................... | 370/311 |
| 7,809,582 B2 * | 10/2010 | Wessling et al. | ............. | 705/1.1 |
| 8,370,341 B1 * | 2/2013 | Cromwell et al. | ............ | 707/726 |
| 2002/0035697 A1 * | 3/2002 | McCurdy et al. | ............ | 713/200 |

(Continued)

*Primary Examiner* — Robert J Utama
(74) *Attorney, Agent, or Firm* — Ascenda Law Group, PC

(57) ABSTRACT

Disclosed in some examples is a system for electronic learning support, the system having a content-ingestion module to generate a. digital specification in a first language from a set of input parameters for one or more of a plurality of digital templates, the digital specification including instructions which when executed by an execution environment of an electronic reading device, cause the electronic reading device to present one or more interactive content presentation objects and one or more interactive assessment objects, the execution environment being one of a plurality of execution environments, each execution environment being specific to one of a plurality of heterogeneous electronic reading devices; a digital specification delivery module executed by the one or more processors to transmit the digital specification to the electronic reading device; and an interaction module to: receive content interaction data corresponding to user interactions with the interactive content presentation objects from the execution environment and to send at least a subset of the content interaction data to at least one other electronic reading device, and to receive assessment data corresponding to user interactions with the interactive assessment objects from the execution environment.

92 Claims, 31 Drawing Sheets

(56) References Cited

U.S. PATENT DOCUMENTS

| | | | |
|---|---|---|---|
| 2002/0182578 A1* | 12/2002 | Rachman et al. | 434/350 |
| 2003/0023554 A1* | 1/2003 | Yap et al. | 705/43 |
| 2003/0129574 A1* | 7/2003 | Ferriol et al. | 434/362 |
| 2004/0139400 A1* | 7/2004 | Allam et al. | 715/526 |
| 2005/0132070 A1* | 6/2005 | Redlich et al. | 709/228 |
| 2005/0273399 A1* | 12/2005 | Soma et al. | 705/26 |
| 2006/0026536 A1* | 2/2006 | Hotelling et al. | 715/863 |
| 2007/0099167 A1* | 5/2007 | Eason | 434/350 |
| 2008/0187892 A1* | 8/2008 | Lancaster | 434/178 |
| 2008/0243828 A1* | 10/2008 | Reztlaff et al. | 707/5 |
| 2008/0259057 A1* | 10/2008 | Brons | 345/184 |
| 2009/0058822 A1* | 3/2009 | Chaudhri | 345/173 |
| 2009/0094538 A1* | 4/2009 | Ringler | 715/760 |
| 2009/0125413 A1* | 5/2009 | Le Chevalier et al. | 705/26 |
| 2010/0003659 A1* | 1/2010 | Edmonds | 434/350 |
| 2010/0156913 A1* | 6/2010 | Ortega et al. | 345/520 |
| 2010/0161499 A1* | 6/2010 | Holcombe et al. | 705/310 |
| 2011/0167350 A1* | 7/2011 | Hoellwarth | 715/727 |
| 2012/0050012 A1* | 3/2012 | Alsina et al. | 340/10.1 |

* cited by examiner

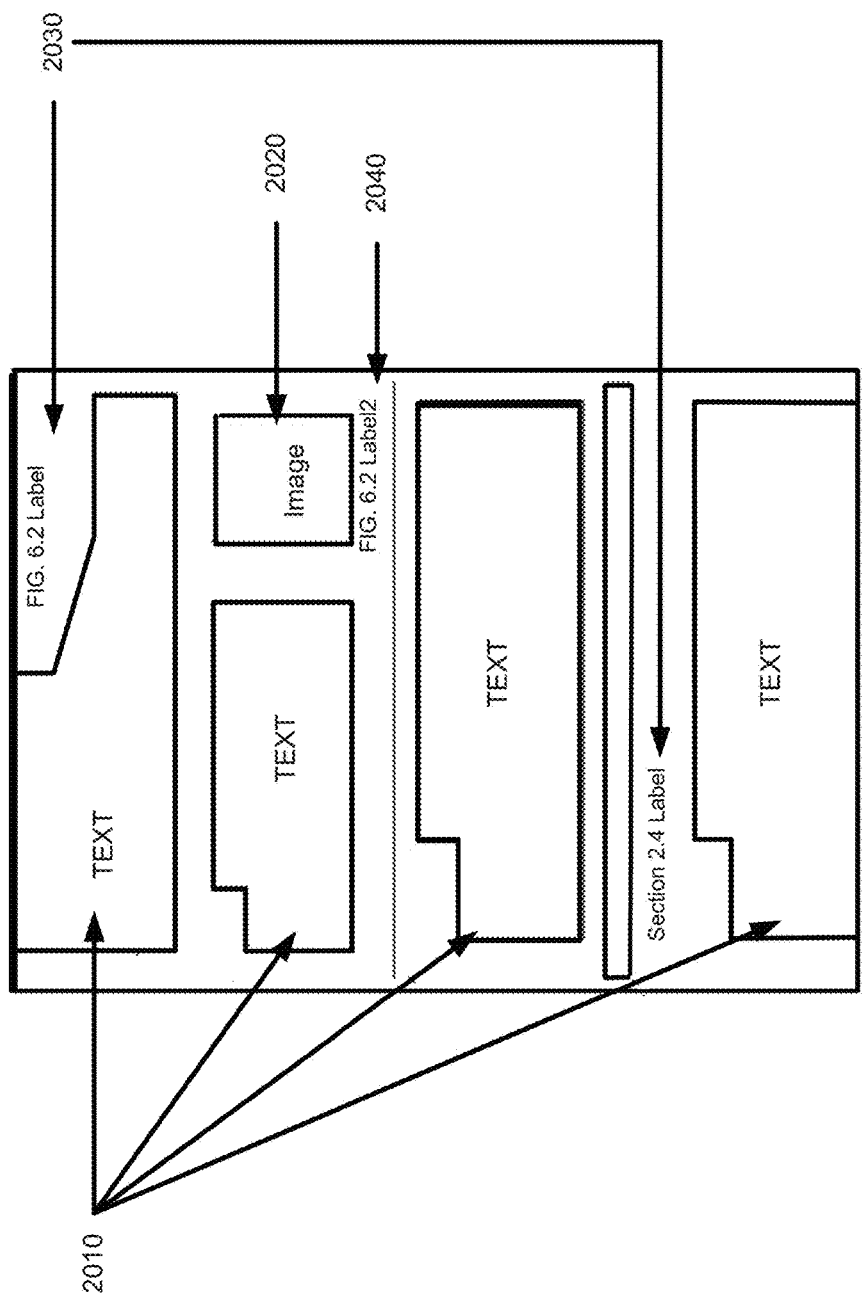

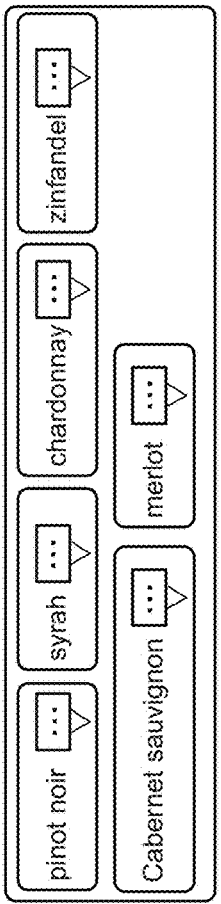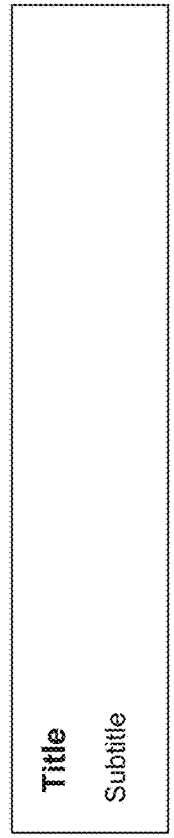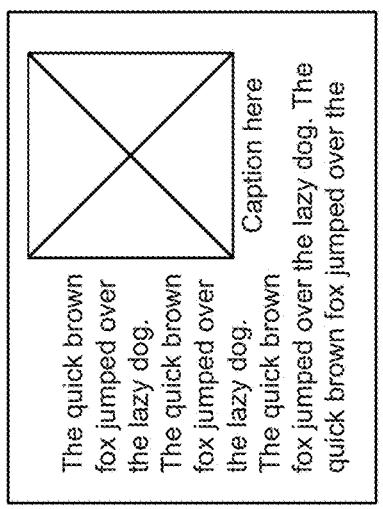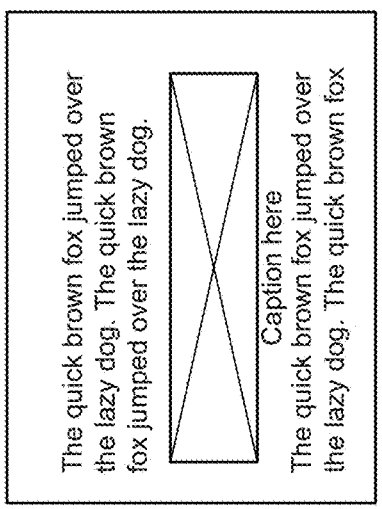

Welcome to Inkling!

Inkling brings the world's best content to iPad with interactivity, social collaboraton and simple ease-of-use.

- What keeps both the Earth and the Moon in their respective orbits?
  ↑ Show Answer

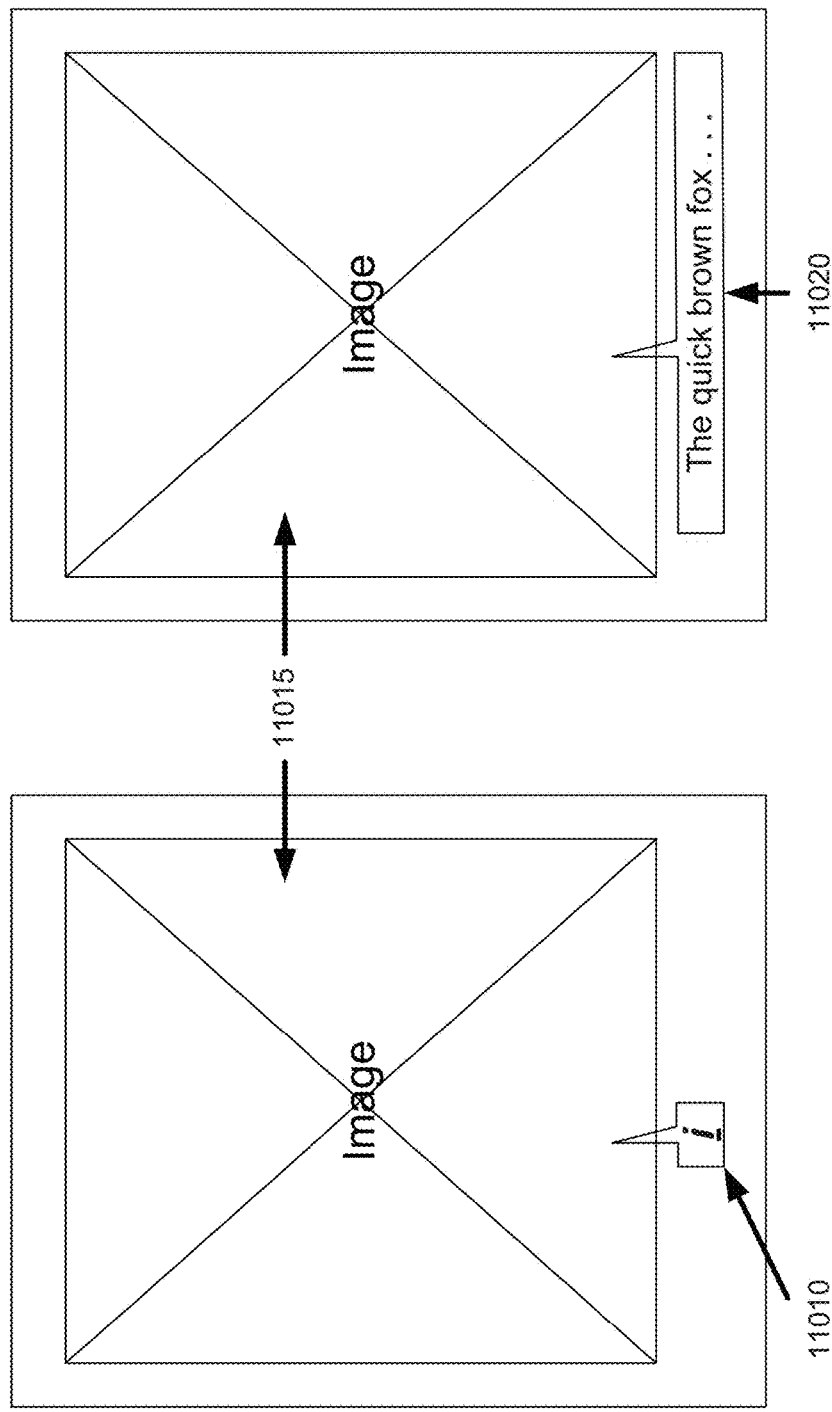

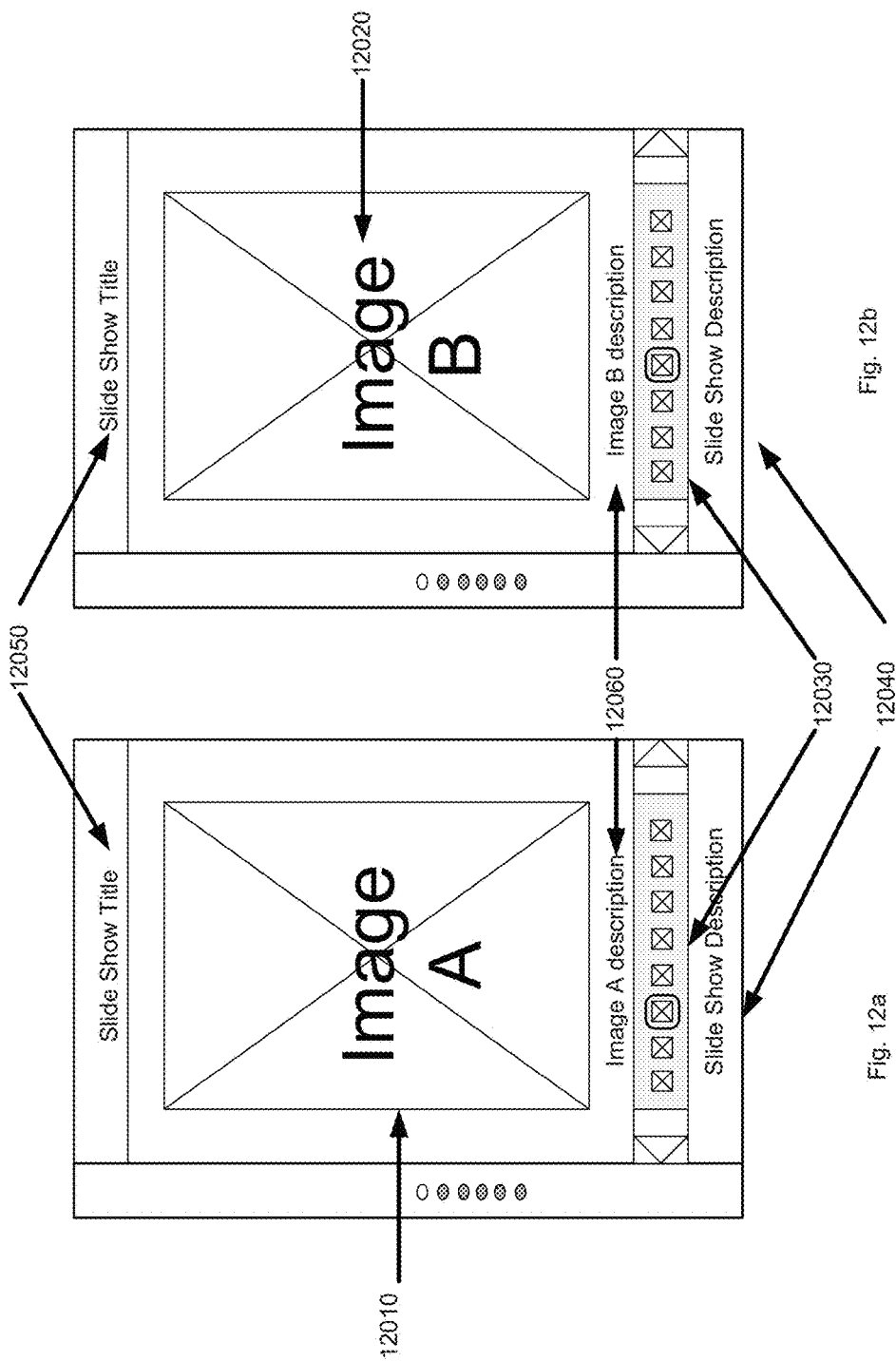

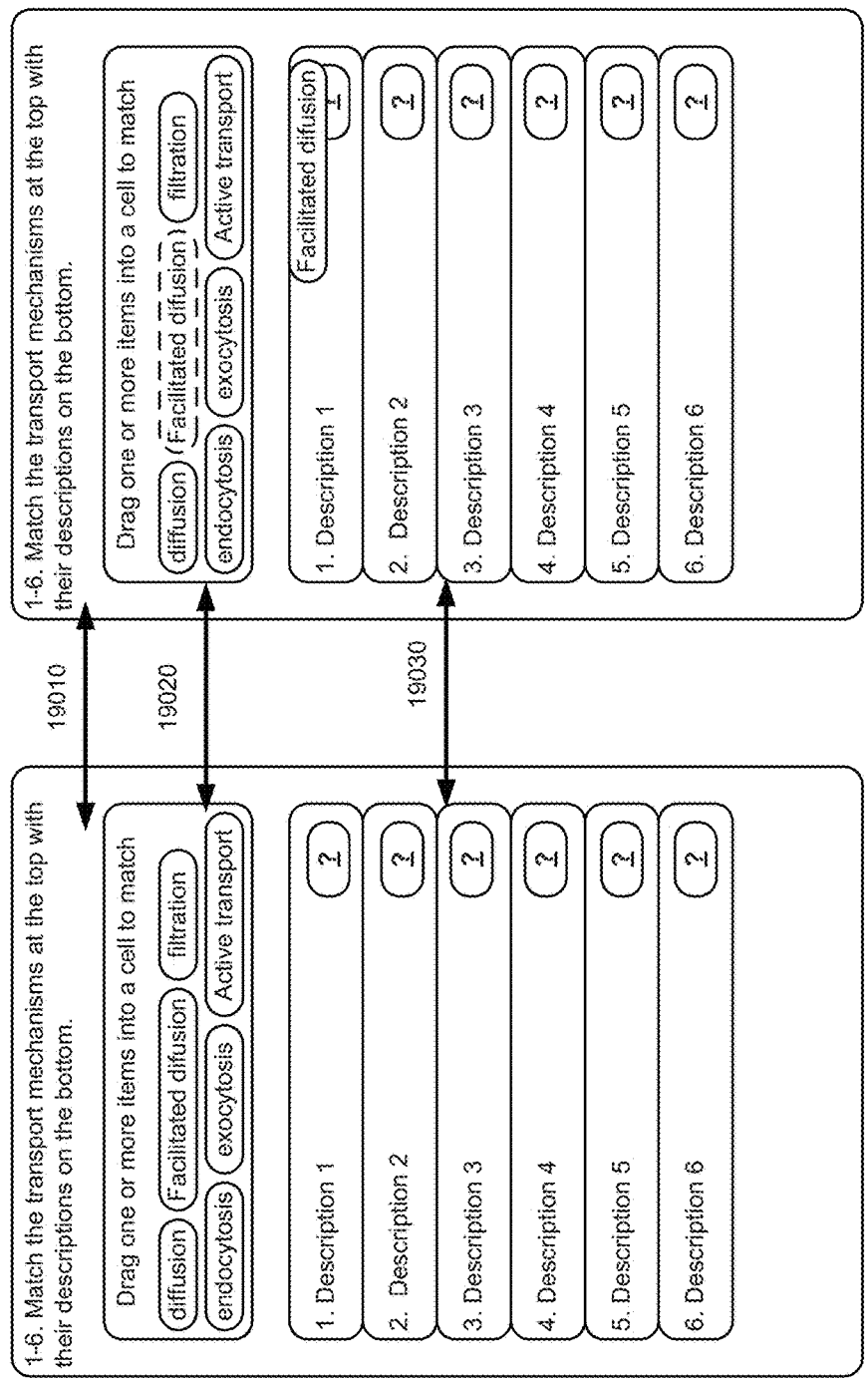

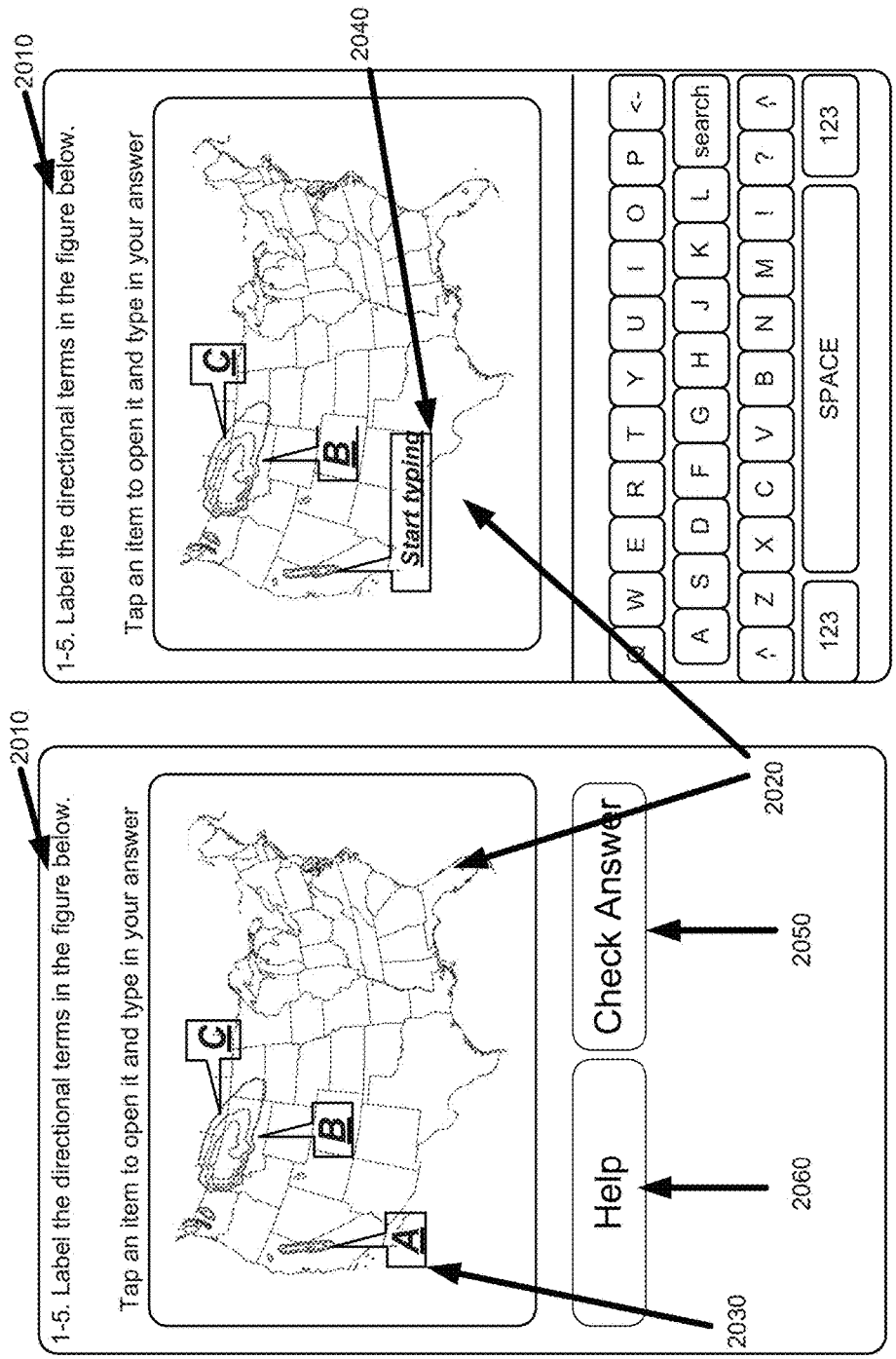

Content Ingestion

SYSTEM AND METHODS FOR CROSS PLATFORM INTERACTIVE ELECTRONIC BOOKS

CLAIM OF PRIORITY

This patent application claims the benefit of priority, under 35 U.S.C. Section 119(e), to U.S. Provisional Patent Application Ser. No. 61/300,319, to Charles M. MacInnis, entitled "Apparatus and Methods for Digital Interactive Educational Content," filed on Feb. 1, 2010, which is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Standard Nine Inc. (d.b.a. Inkling), All Rights Reserved.

BACKGROUND

As the use of personal computing devices to read and view content becomes more commonplace, there is a growing need to provide consumers with rich, interactive content, including learning content. The current generation of electronic reading technology remains relatively limited in its ability to dynamically manipulate and modify the content and its presentation to the user in accordance with the individual user's preferences and needs.

Current electronic reading technology often follows too closely to the traditional constraints of paper-based content. That is, current electronic books tend to be just digital reproductions of the paper-based content—static text and static images. These limitations may not be as pronounced when the electronic media content is a typical popular book such as a novel, since those works are normally intended to be read in linear fashion, start-to-finish, however, for more complex media content such as educational material, this presentation format provides few advantages over traditional paper based textbooks.

Some interactive textbooks that have been proposed use specialized electronic book-reading systems, using a dedicated hardware platform to support digital books written in a proprietary, compatible format for that platform. This approach, however, fails to leverage the increasing market penetration of more generalized, mainstream electronic book readers (e.g. iPad™, Nook™, Kindle™, laptop computers, mobile phones, desktop computers, etc).

SUMMARY

Disclosed in some examples is a system for electronic learning support including a content-ingestion module to generate a digital specification in a first language from a set of input parameters for one or more of a plurality of digital templates, the digital specification including instructions which, when executed by an execution environment of an electronic reading device, cause the electronic reading device to present one or more interactive content presentation objects and one or more interactive assessment objects, the execution environment being one of a plurality of execution environments, each execution environment being specific to one of a plurality of heterogeneous electronic reading devices; a digital specification delivery module executed by the one or more processors to transmit the digital specification to the electronic reading device; and an interaction module to: receive content interaction data corresponding to user interactions with the interactive content presentation objects from the execution environment and to send at least a subset of the content interaction data to at least one other electronic reading device, and to receive assessment data corresponding to user interactions with the interactive assessment objects from the execution environment.

Disclosed in another example is a method for electronic learning support by generating a digital specification in a first language from a set of input parameters for one or more of a plurality of digital templates, the digital specification including instructions which when executed by an execution environment of an electronic reading device, cause the electronic reading device to present one or more interactive content presentation objects and one or more interactive assessment objects, the execution environment being one of a plurality of execution environments, each execution environment being specific to one of a plurality of heterogeneous electronic reading devices; transmitting the digital specification to the electronic reading device using a computer processor; receiving content interaction data corresponding to the user interactions with the interactive content presentation objects from the execution environment; and sending at least a subset of the content interaction data to at least one other electronic reading device, and receiving assessment data corresponding to user interactions with the interactive assessment objects from the execution environment.

In yet other examples, disclosed is a machine readable medium that stores instructions which when performed by a machine, causes the machine to perform operations of: generating a digital specification in a first language from a set of input parameters for one or more of a plurality of digital templates, the digital specification including instructions which, when executed by an execution environment of an electronic reading device, cause the electronic reading device to present one or more interactive content presentation objects and one or more interactive assessment objects, the execution environment being one of a plurality of execution environments, each execution environment being specific to one of a plurality of heterogeneous electronic reading devices; transmitting the digital specification to the electronic reading device; receiving content interaction data corresponding to user interactions with the interactive content presentation objects from the execution environment; sending at least a subset of the content interaction data to at least one other electronic reading device; and receiving assessment data corresponding to user interactions with the interactive assessment objects from the execution environment.

In another example, disclosed is a method for electronic learning by retrieving a digital specification in a first language; parsing the digital specification, and responsive to instructions contained in the digital specification, presenting one or more interactive content presentation objects and one or more interactive assessment objects by converting the instructions in the digital specification to a second language which is executed by one or more computer processors; receiving content interaction data corresponding to user interactions with the interactive content presentation objects and sending the interaction data to an interaction server; receiving a second content interaction data corresponding to a second user's interactions with the interactive content presentation objects from the interaction server; presenting the second content interaction data; and sending to the interaction server, assessment data corresponding to user interactions with the interactive assessment objects.

In yet other examples, disclosed is a system for electronic learning including an input module to receive a digital specification in a first language; a presentation module with one or more computer processors to parse the digital specification, and responsive to instructions contained in the digital specification, present one or more interactive content presentation objects and one or more interactive assessment objects by converting the instructions in the digital specification to a second language which is executed by one or more computer processors; an interaction module to: receive content interaction data corresponding to user interactions with the interactive content presentation objects and to send the interaction to an interaction server; receive a second content interaction data corresponding to user interactions with the interactive content presentation objects from the interaction server and presenting the second digital interaction; and send assessment data corresponding to user interactions with the interactive assessment objects from the execution environment.

In yet other examples, disclosed is a machine readable medium that stores instructions which when performed by a machine, causes the machine to perform operations of retrieving a digital specification in a first language; parsing the digital specification, and responsive to instructions contained in the digital specification, presenting one or more interactive content presentation objects and one or more interactive assessment objects by converting the instructions in the digital specification to a second language which is executable by the one or more computer processors; receiving content interaction data corresponding to user interactions with the interactive content presentation objects and sending the interaction to an interaction server; receiving a second content interaction data corresponding to a second user's interactions with the interactive content presentation objects from the interaction server; presenting the second digital interaction; and sending to the interaction server, assessment data corresponding to user interactions with the interactive assessment objects.

These examples may be combined in any permutation or combination. This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

FIG. 2 shows a media card according to some examples of the present disclosure.

FIG. 3 shows an embedded figure according to some examples of the present disclosure.

FIG. 4 shows a full figure according to some examples of the present disclosure.

FIG. 5 shows a key term cloud according to some examples of the present disclosure.

FIG. 6 shows a key term table according to some examples of the present disclosure.

FIG. 7 shows a header according to some examples of the present disclosure.

FIG. 8 shows an hgroup according to some examples of the present disclosure.

FIG. 11a shows a closed poptip according to some examples of the present disclosure.

FIG. 11b shows an open poptip according to some examples of the present disclosure.

FIG. 12a shows one image in a slideshow according to some examples of the present disclosure.

FIG. 12b shows another image in a slideshow according to some examples of the present disclosure.

FIG. 19a shows a matching assessment according to some examples of the present disclosure.

FIG. 19b shows a matching assessment according to some examples of the present disclosure.

FIG. 20a shows a fill in assessment according to some examples of the present disclosure.

FIG. 20b shows a fill in assessment according to some examples of the present disclosure.

Figure 1:
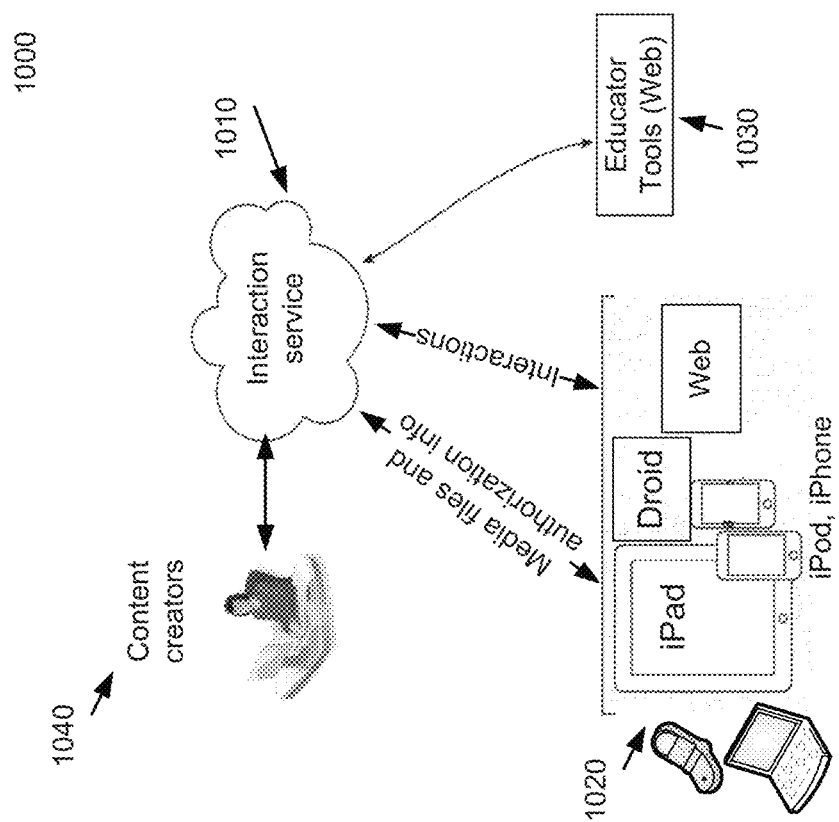
FIG. 1 shows a system according to some examples of the present disclosure.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Disclosed is a creation, delivery, and presentation system and method for cross-platform interactive electronic books. The interactive electronic books may consist of one or more interactive content presentation objects and one or more interactive assessment objects and are created by content authors using templates and input parameters which are converted by the system's content ingestion processes to a platform independent digital specification of the electronic book. This platform independent digital specification along with the various electronic media therein is then made available to users, who then execute the platform independent digital specification in an execution environment on an electronic reader. The execution environment presents the electronic book or part of the electronic book to the user by utilizing the instructions in the platform independent digital specification. The platform independent digital specification instructs the execution environment on the proper placement of the various media objects and the proper responses upon user interactions with the media. During the presentation of the electronic book, the various pieces of the electronic book allow for various user interactions, some of which may be social in nature and allow for users to communicate with other users of the electronic book. The system and method includes in some examples, publishing tools, content transformation or ingestion tools, distribution tools, the execution environments, and interaction tools.

The present disclosure describes certain operations with respect to electronic books. These operations are equally applicable to other types of media including electronic pamphlets, magazines, study aids, practice questions, or the like, as well as electronic books. It should also be appreciated that those operations are equally applicable to portions of those materials.

FIG. 1 shows a system 1000 according to some examples including an interaction service 1010, electronic reader devices 1020, educator tools 1030, and content creators 1040.

The interaction service 1010 receives content from content creators 1040 and transforms the content in the content ingestion processes to a platform independent digital specification. In some examples, the content may be an electronic book. This representation is then placed in storage where users running an execution environment on the reader devices 1020 may download or otherwise access this content. The electronic reader devices 1020 present the content to the users of the electronic reader devices. Users may then interact with the content on the electronic reader devices 1020 and also with other users of the content through social networking applications running in the interaction service 1010.

Electronic Book

In some examples, an electronic book contains at least one interactive content presentation object and in some other examples contains at least one interactive assessment objects, and in other examples contains both. An interactive content presentation object is any information and/or experiences presented by the electronic reader to an end-user and allows for user interaction. In some examples, an interactive content presentation object presents text, graphics, figures, graphical models, video, audio, audio video, or the like to a user and in some examples allows for user interaction. An interactive assessment object is any information and/or experiences presented by the electronic reader to an end-user to assess their knowledge (e.g., of or about content provided as part of an interactive content presentation object). In some examples, an interactive assessment object is an object that, when presented by an electronic reader, presents a question or series of questions along with audio, video, audio-video, text, graphics, and/or the like to test a user's knowledge of a part of the book, or other content. Types of interactive assessments include, but are not limited to: multiple choice, matching, reordering, audio based assessments, and the like.

User interactions may be any user action that acts on, with, or about the interactive content presentation objects or interactive assessment objects. User interactions may include in some examples, user bookmarks of certain locations in the book, user comments, notes, or questions left in a certain point of the book, user highlighting of the book, user quoting of the book, user manipulation of the various interactive elements of the interactive content presentation or assessment objects such as zooming, panning, and rotating graphics, and the like. In some examples, the interactivity may be social so that other users viewing the interactive content presentation object may see at least a portion of another user's interactions. Thus, for example, a user may leave a note or question that some, or all, of the individuals also viewing that content presentation may see, read, answer, or react to. In other examples, the user may leave a note to an instructor, who may respond. In still other examples, an individual may share a bookmark indicating the current user's reading location to other users.

In some embodiments, an electronic book may be represented in a platform independent way, which is then executed by execution environments on various heterogeneous devices to produce a visually consistent presentation of the interactive content presentation objects and in some examples, interactive assessment objects. The interactive content presentation and assessment objects are presented using locally available application programming interfaces such that the user interface style matches that of the device. Thus for example, when the book is executed on a WINDOWS™ device, it will appear to match the WINDOWS™ style, but on an IOS™ device such as an IPAD™, will match the IOS™ look and feel. WINDOWS™ is an operating system developed by MICROSOFT™, Inc. of Redmond, Wash., IOS™ is a different operating system developed by APPLE™, Inc. of Cupertino Calif.

The electronic books and the constituent presentation objects may be created by content authors using digital content templates. Content templates, or blueprints, consist of a number of standardized content presentation formats, or shells, which authors use as a basis for producing the various interactive content presentation objects. In some examples, only content presentation objects created with a content blueprint will be valid content recognized by the execution environment. This may be to ensure that the content is properly handled, recognized, and displayed by the various execution environments running on the different types of electronic readers. In some examples, the blueprint may be an extensible markup language ("XML") file, a hypertext markup language ("HTML") file, or the like. Once a blueprint is instantiated, it may be called a "media card." An example abstraction of a media card 2000 is shown in FIG. 2 which shows one or more text sections 2010 and one or more image sections 2020 along with header sections 2030 and image caption 2040 arranged in a desired order.

In some examples, while the various blueprints are described in a platform agnostic manner, the various media cards formed from those blueprints may be displayed differently depending on the electronic reader platform. This is because different devices may have different capabilities. For example, an IPHONE™ may not be able to display the same image resolution as an IPAD™. Therefore in some examples, the image, video, audio, or other media may be adjusted depending on the device capabilities. Device capabilities that may impact the presentation layout may include screen size, screen resolution, video capabilities, audio capabilities, and the like. As a result of these differences the layout of the card may be impacted. Therefore, in some examples, the blueprints and associated media (such as images) may be processed in the interaction service such that even if the two different reader devices have different capabilities (for example, the image capabilities of the two devices are different), the blueprints and the associated media objects are adjusted for that platform to display everything in a visually consistent manner that is platform appropriate. Thus for example, the images, the interactions, the layouts, and the like are displayed in the right locations, in a platform appropriate manner and according to the capabilities of the device. The platform appropriate manner referring to the look and feel of the user interface elements of the reader. Thus the electronic book will have an IOS™ look and feel on an IPAD™, but a WINDOWS™ look and feel on a WINDOWS™ device. Thus for example, even though an image may be in a different place, with different resolutions the interactions with that image and the layout appear consistent—e.g., in the correct places and in a user friendly manner.

The interaction system may be aware of the characteristics of a given target device, such as its display size, the pixel density of the display, its aspect ratio, whether it supports touch-based input, how much memory is available to the application, and other characteristics. The system may preprocess data for a given target device. For example, for low-resolution displays, or for systems with limited amounts of runtime memory available to the application, lower resolution versions of the data may be sent to the device. Furthermore, if a device lacks touch-based input support, a mouse-and-keyboard based interface may be presented to the user. If devices have high-density pixel displays, such as APPLE® Inc's "Retina Display," images and icons can be displayed at a higher resolution than devices that lack such pixel density. The system may make modifications to the data before sending to the device, or the device may interpret the data differently at runtime. In both cases, the platform independent representation of the interactive data being displayed is the same.

Some example content blueprints may include a table of contents blueprint for displaying the electronic book's table of contents, a reader blueprint for text and graphics, a image figure blueprint, a multi-image figure (or slideshow) blueprint, a guided tour blueprint, a test-yourself blueprint, a sideline™ blueprint, video blueprint, glossary blueprints, and assessment blueprints. Blueprints may contain links to other media files such as images, videos, audio, and the like to complete the presentation.

The table of contents blueprint of an electronic book represents the organization of the overall title and describes how the rest of the media cards in the title are structured. In some examples, this may take the form of a tree structure with the table of contents card being the root node. In some examples, the other media cards may be organized into chapters and all chapters may be organized into units, and so on. Each chapter may consist of primary cards (generally reading cards that correspond with sections from the main text) and embedded cards (image figures and other reading cards that are linked to from the primary cards). Embedded cards may be included as children of the parent card in the table of contents card. Other linear and non-linear structures may be represented depending on the application. The table of contents blueprint may be platform agnostic, as already explained, however both the various included media and the blueprint may be adjusted by the interaction service to adjust for different device characteristics. Thus, for example, even if the media capabilities of two different devices are different, the blueprint will be adjusted for that platform so that the layout is correct across both devices.

Cards created from the blueprints may contain one or more links to other cards and other content including other reader cards, other image figure cards, etc . . . . In some examples, the electronic book does not need to be linearly organized into the traditional book concepts of chapter, section, page, etc. . . . . In some examples, other links take users to a glossary, more in-depth coverage of a topic, or manipulable images which allow a user to zoom, rotate, or pan. In some examples, the table of contents contains links to all other cards in the book.

Figures 9, 10:
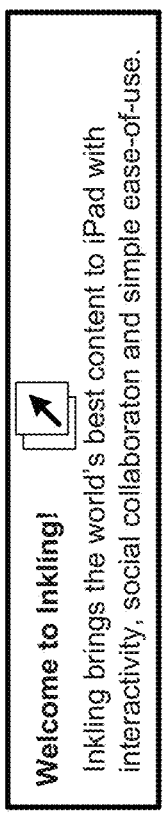
FIG. 9 shows an article according to some examples of the present disclosure.
FIG. 10 shows a review answer according to some examples of the present disclosure.

The reader blueprint in some examples may include different objects including text, figures, images, key term clouds or tables, inline glossary terms, headers, Hgroups, articles, and review objects, and the like. Some figures appear interspersed with the text around it or to one side, with an optional caption. An example of which is shown in FIG. 3. Some figures may break apart the text column, an example of which is shown in FIG. 4. An image may or may not be captioned. A key term cloud is a group of buttons placed on the page with key terms listed as the button text. Selecting the button pops up a definition of the key term, or links to another card where the term is defined. An example key term cloud is shown in FIG. 5. A key term table is similar to a key term cloud except the buttons are presented in a table format, an example of which is shown in FIG. 6. In some examples, the key term cloud and the key term table may contain both a pop-up definition and a link to the card where the key term is defined in more detail, thus a user may select either the pop-up definition or the link. In still other examples, the definition bubble popped up by the pop-up includes a further link, which when selected by the user takes the user to a card with more information on the term. An inline glossary produces selectable images or text which when selected pop a bubble on the screen with more information. These may be either hyperlinks (or some other means of attracting a viewer's attention to this feature associated with the word) on the words themselves in the sentences in which they are used, or on the same page below the text or image. Headers are specially formatted content that is title-specific, an example is shown in FIG. 7. An Hgroup is an element that may be used to group the headers, an example of which is shown in FIG. 8. An article defines external content. In some examples they include external hyperlinks that may be a news-article from an external provider, or text from a web log ("blog"), or a text from a forum, or any other content from an external source. One example of an article is shown in FIG. 9. Review answer elements present a question to allow the user to test him or herself. The correct answer is clickably revealed. One example review answer is shown in FIG. 10. The reader blueprint may be platform agnostic, as already explained, however both the various included media and the blueprint may be adjusted by the interaction service to adjust for different device characteristics. Thus, for example, even if the media capabilities of two different devices are different, the blueprint will be adjusted for that platform so that the layout is correct across both devices.

The image blueprint displays a photograph or illustration with an optional scrollable caption. In some examples captions may also be initially hidden in order to allow the image to fill the entire screen, but revealed in response to some user interaction with the image. In some examples the image blueprint offers zoom, pan and rotation capabilities. In some examples, image blueprints may be enhanced with poptip annotations, anchored at any point on the image. A poptip is a context sensitive annotation of content that when selected presents additional content related to the image or other content in a container overlaid over a portion of the content. FIGS. 11a and 11b show an example of an image blueprint with a pop-tip annotation that is closed. Responsive to a user tapping or clicking on the poptip bubble 11010 which is pointing to an area on image 11015, the bubble expands to include additional information 11020. Additional information 11020 may include text, graphics, pictures, audio, audio-visual, or any other interactive content presentation or assessment objects. The image blueprint may be platform agnostic, as already explained, however both the image and the blueprint may be adjusted by the interaction service to adjust for different device characteristics. Thus, for example, even if the images on two different devices are of different sizes, the blueprint will be adjusted for that platform so that the pop-tip is displayed in the right location and the layout of the text and other elements around and near the image is correct.

The slideshow blueprint presents a series of images in independent displays with a master caption for the entire slideshow and sub-caption for each individual image. For each slide, the slideshow blueprint offers all features of the full-screen image with annotations. The user may swipe or page through the images and still have access at all times to the master caption. The slideshow blueprint in some examples has a navigation bar and in some examples the navigation bar comprises a series of thumbnail images of the various images in the slideshow. FIGS. 12a and 12b show examples of two successive slideshow images 12010 and 12020. Navigation bar 12030 shows thumbnail images of the various images in the slideshow with an indicator showing the present position in the slideshow. Master caption 12040 describes the slideshow, title bar 12050 shows the title of the slideshow, and subcaption 12060 provides an individualized caption for each image in the slideshow. The slideshow blueprint may be platform agnostic, as already explained, however both the image and the blueprint may be adjusted by the interaction service to adjust for different device characteristics. Thus, for example, even if the images on two different devices are of different sizes, the blueprint will be adjusted for that platform so that the images, navigation bar, thumbnails, master caption, title subcaptions, and the like are displayed in the right locations and in a manner appropriate to the device.

Figure 13B:
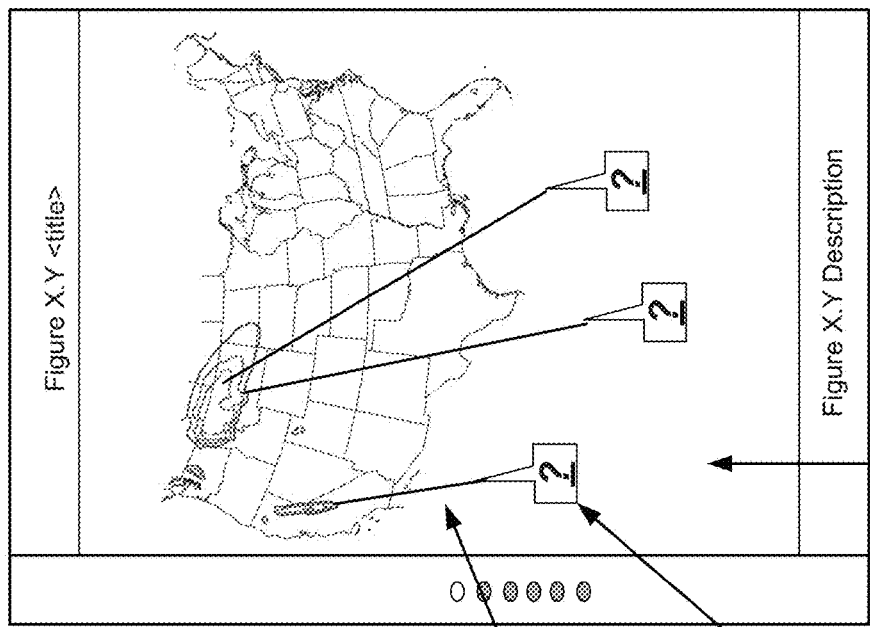
FIG. 13b shows another image in a test yourself blueprint according to some examples of the present disclosure.
Figure 13A:
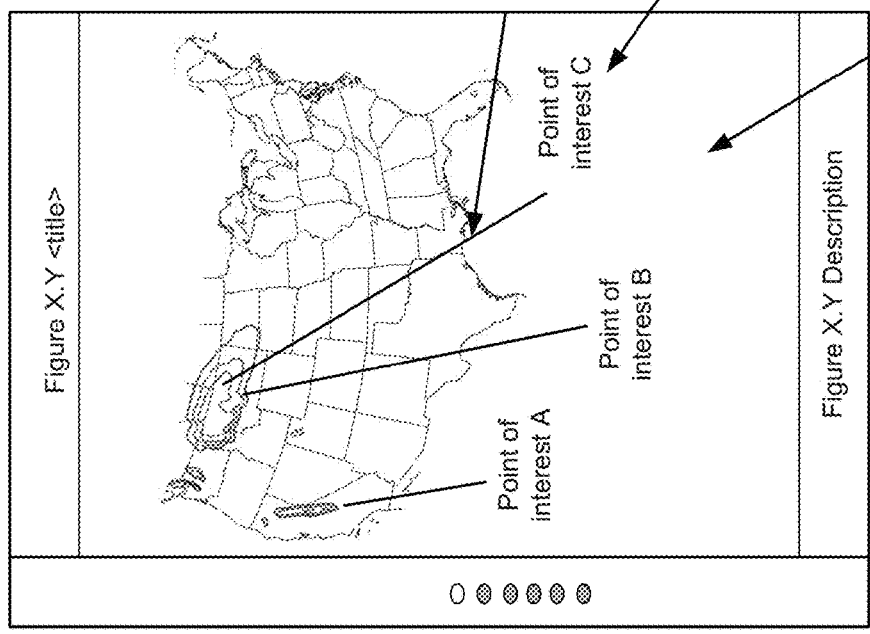
FIG. 13a shows one image in a test yourself blueprint according to some examples of the present disclosure.

The test-yourself blueprint is a blueprint with two images. The images are generally annotated images with leader lines from various points in the image to text describing that part of the image. When the card loads, the text is not displayed and users may "test themselves" by guessing what the various pieces of the image describe. In some examples, the text is replaced with a poptip. FIGS. 13a and 13b illustrate images 13010 and 13020 with leader lines 13030 leading to various points of interest on the image. The second view allows a user to test his or her knowledge by hiding the text descriptions (for example, 13040) with poptips (for example 13050). A user can mentally guess the answer, then select the poptip to check whether they were correct or not. The test-yourself blueprint may be platform agnostic, as already explained, however both the image and the blueprint may be adjusted by the interaction service to adjust for different device characteristics. Thus, for example, even if the images on two different devices are of different sizes, the blueprint will be adjusted for that platform so that the pop-tips are displayed in the right location and the layout of the text and other elements around and near the image is correct.

Figure 14B:
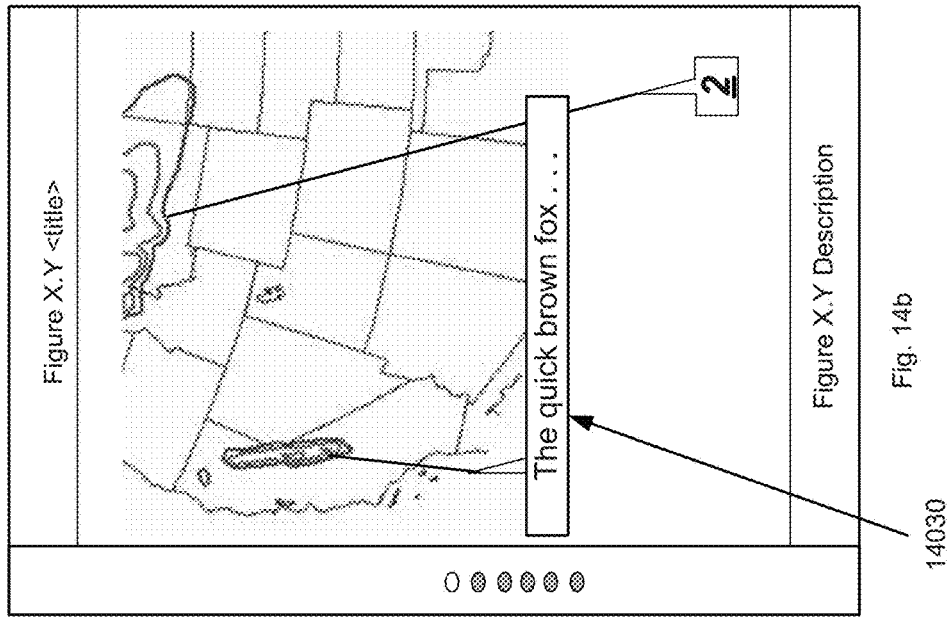
FIG. 14b shows an operation in a guided tour according to some examples of the present disclosure.
Figure 14A:
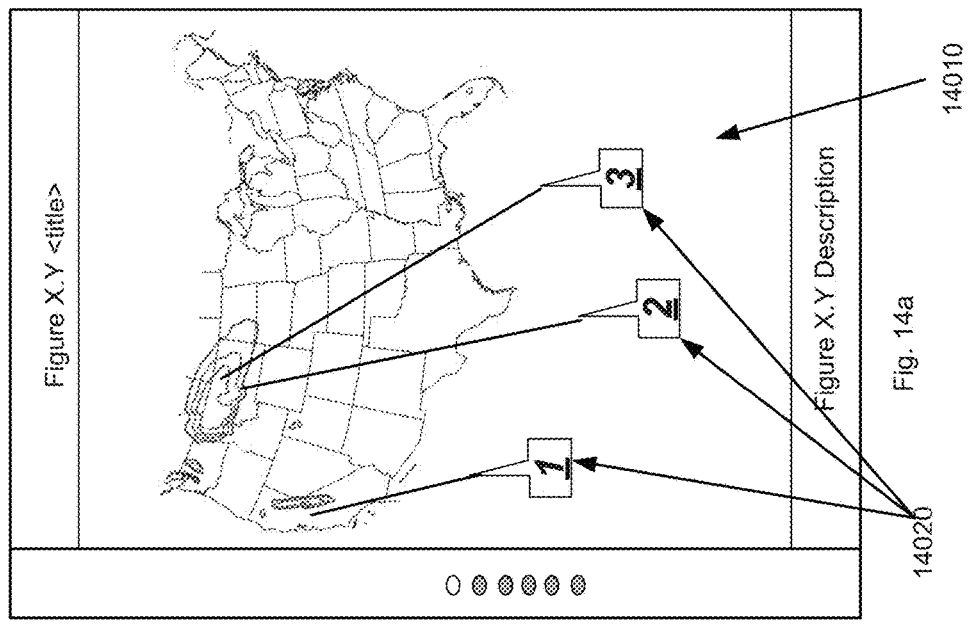
FIG. 14a shows a guided tour according to some examples of the present disclosure.

A guided tour blueprint is a convenient way of describing a complex diagram with numerous steps or complicated concepts. This blueprint displays a single large image and steps the user through various points in the image, zooming to a specific region of the image, and automatically displaying annotations as the image is navigated. In some examples, poptips may be displayed. One example guided tour is shown in FIGS. 14a-14b. Image 14010 is shown with various steps 14020 (1-3 in the FIG.). In some examples, steps 14020 may be poptips. Stepping to step 1 zooms the image toward step 1 and expands the poptip of that step 14030. As show in FIG. 14b, stepping to step 1 zooms the image toward step 1 and expands step 1's poptip. Advancing or stepping to step 2 zooms the image toward that step and expands that steps pop-tip and so on. The guided tour blueprint may be platform agnostic as already explained, however both the media and the blueprint may be adjusted by the interaction service to adjust for different device characteristics. Thus, for example, even if the images on two different devices are of different sizes, the blueprint will be adjusted for that platform so that the region of interest is always included in what is rendered for the user, and the layout of the text and other elements around and near the image is correct regardless of the shape/size of their display.

Figure 15:
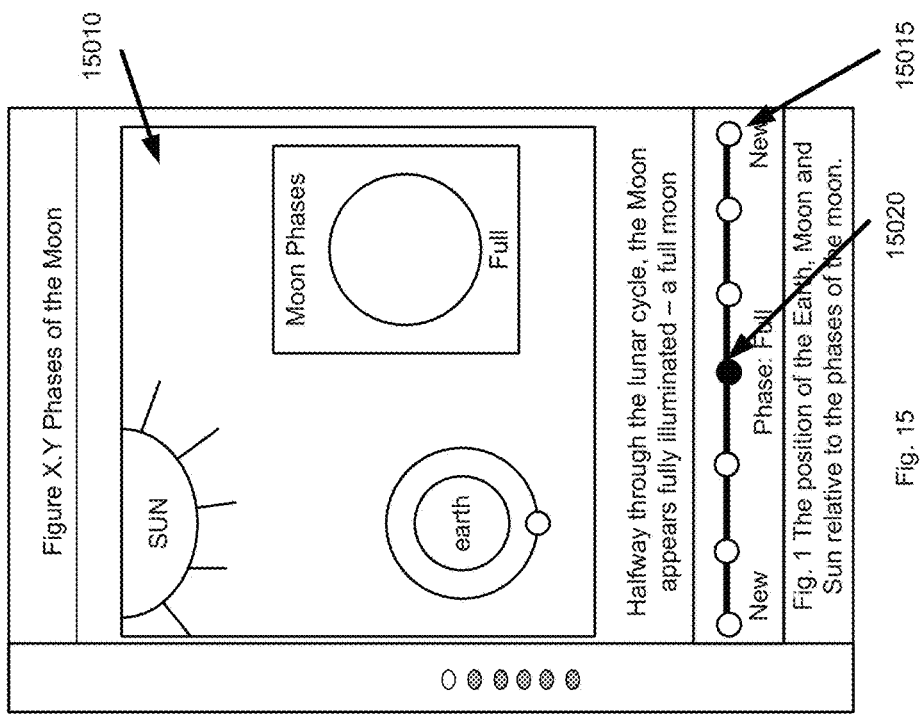
FIG. 15 shows one image in a slide-line according to some examples of the present disclosure.
Figure 16:
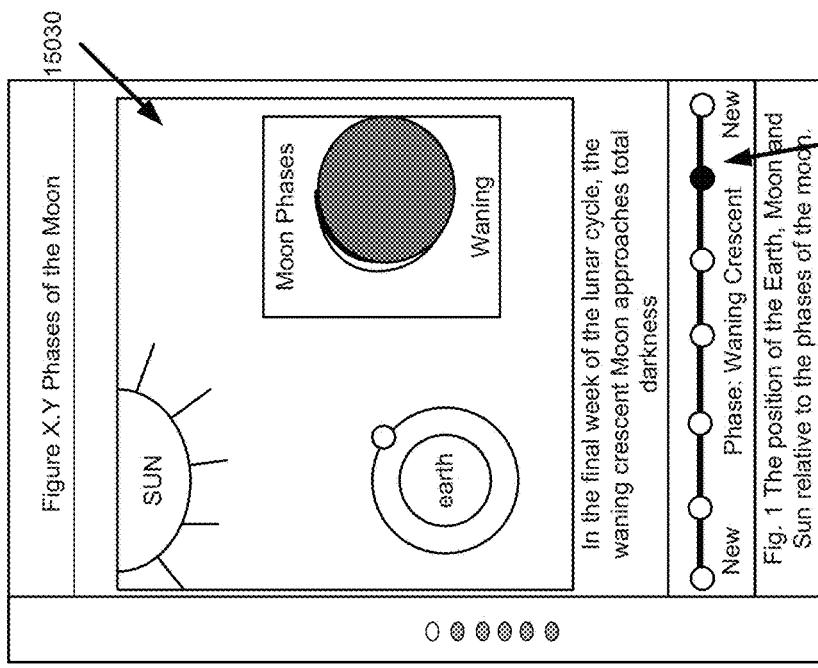
FIG. 16 shows another image in a slide-line according to some examples of the present disclosure.

The "SLIDE-LINE™" blueprint is used to present a series of static images that relate to each other along some kind of one-dimensional scale. Each image is represented on the scale as a keyframe (in some examples a white dot). You may see their position on the scale and either tap on them or swipe along the slider bar to advance to the next position. FIGS. 15 and 16 illustrate an example slide-line blueprint. Image 15010 is represented along a scale 15015 as keyframe 15020, while image 15030 is displayed as keyframe 15040. In some examples, a user advances from the image of 15 to 16 by gliding their finger across the scale 15015. In other examples, the user may press a particular keyframe 15040 to advance. The slide-line blueprint may be platform agnostic as already explained, however both the media and the blueprint may be adjusted by the interaction service to adjust for different device characteristics. Thus, for example, even if the images on two different devices are of different sizes, the blueprint will be adjusted for that platform so that the region of interest is always included in what is rendered for the user and the layout of the text and other elements around and near the image is correct, regardless of the shape/size of their display.

Video blueprints may be used to display and show video. In some examples the video may include audio. The video may be played, stopped, paused, rewound, and fast forwarded. In some examples, the video player may slow down the video so that a user can see difficult concepts slowly, or can see a fast moving process slowly to better understand it. In other examples, the video may be sped up to see a slow moving process faster. In still other examples, the video may be 3-D video, High Definition Video, or the like. The video blueprint may be platform agnostic as already explained, however both the media and the blueprint may be adjusted by the interaction service to adjust for different device characteristics. Thus, for example, the video and the blueprint will be adjusted for that platform so that the video is always rendered appropriately to the user. Such adjustments include the video size, frame-rate, quality, and other video parameters.

Glossary blueprints allow content creators to create a list of important or key terms and definitions for those terms. In some examples the glossary may contain links to cards that describe or fully explain these terms. In some other examples, the glossary may contain pictures, video, or other content. The glossary blueprint may be platform agnostic, as already explained, however both the various included media and the blueprint may be adjusted by the interaction service to adjust for different device characteristics. Thus, for example, even if the media capabilities of two different devices are different, the blueprint will be adjusted for that platform so that the layout is correct across both devices.

Figure 17:
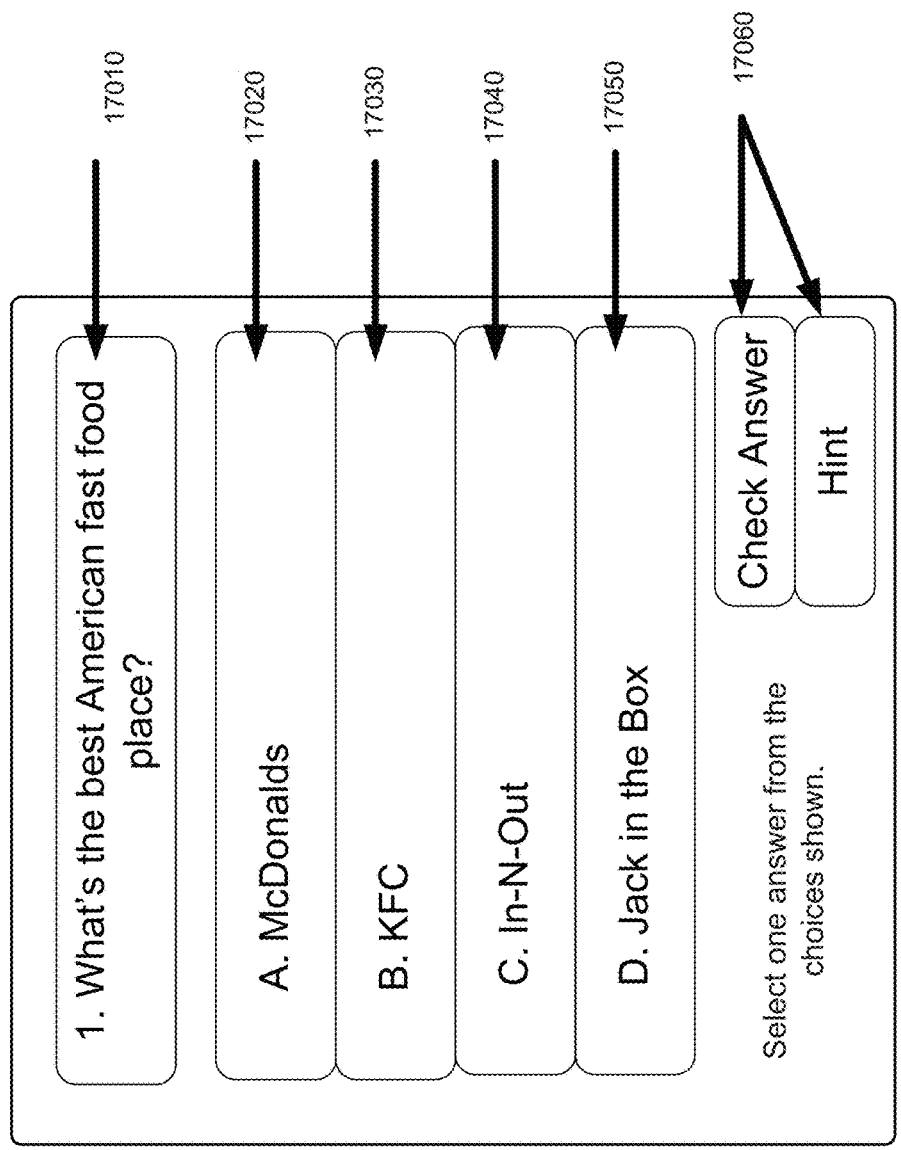
FIG. 17 shows a multiple choice assessment according to some examples of the present disclosure.

Assessment blueprints test readers' knowledge of the subject matter of the electronic book. FIG. 17 shows one example of a multiple choice assessment blueprint. A question 17010 is presented to the user with a list of possible answers 17020-17050. In some examples, only one of the answers is correct, but in other examples, several of the answers may be correct. Buttons 17060 illustrate possible actions. Once a user selects one of the choices, the user may select the check answer button. The check answer button checks the user's selection with the right answer and informs the user of whether the user answered correctly. In some examples, the system will give the user the correct answer, but in other examples the system will let the user pick another choice and check the answer again. A hint button may also provide an answer hint to guide the user to the correct answer. The multiple choice assessment blueprint may be platform agnostic, as already explained, however both the various included media and the blueprint may be adjusted by the interaction service to adjust for different device characteristics. Thus, for example, even if the media capabilities of two different devices are different, the blueprint will be adjusted for that platform so that the layout is correct across both devices.

Figure 18:
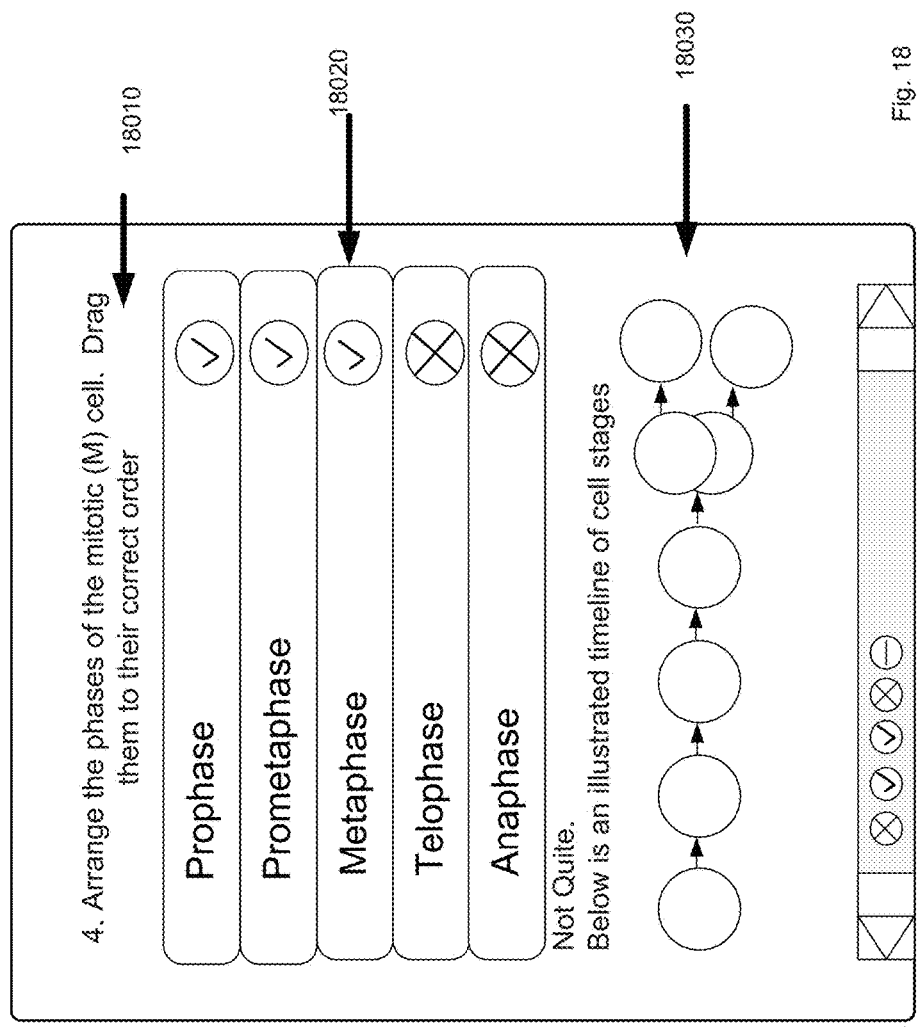
FIG. 18 shows a re-ordering assessment according to some examples of the present disclosure.

A re-ordering assessment is an assessment that presents a user with a list of items and the user tests his or her knowledge of the material by re-ordering the list into a correct order based on the question presented. FIG. 18 shows an example of a re-ordering assessment. In this assessment a question is presented 18010. A list of items 18020 is ordered in a particular order, which in some examples is random, and users are to re-arrange the list into a desired, or correct, order. In some examples, the assessment provides information 18030 to the user regarding their performance. In some examples, the information 18030 may contain images, audio, video, or any other content presentation object. The re-ordering assessment blueprint may be platform agnostic, as already explained, however both the various included media and the blueprint may be adjusted by the interaction service to adjust for different device characteristics. Thus, for example, even if the media capabilities of two different devices are different, the blueprint will be adjusted for that platform so that the layout is correct across both devices.

The matching assessment presents a series or list of items or terms and asks users to correctly match those items or terms with another series or list of corresponding items or terms. FIGS. 19*a* and 19*b* show a matching assessment according to some examples. A question 19010 is presented that defines the matching parameters. 19020 shows the first list or series of items or terms that users need to match to the second list of items or terms 19030. A user may then drag items from the first list 19020 next to items from the second list 19030 as shown in FIG. 19*b*. Once the user has dragged all the items, the assessment may provide feedback to the user. In some examples, the system provides instant feedback to a user upon placing an item in the first list 19010 next to an item in the second list 19020. The feedback provided to the user may include text, images, audio, video, or any other content presentation object. FIG. 19*b* shows an example of how an item in the first list or series 19020 is dragged to be matched to an item in the second list or series 19030. The matching assessment blueprint may be platform agnostic, as already explained, however both the various included media and the blueprint may be adjusted by the interaction service to adjust for different device characteristics. Thus, for example, even if the media capabilities of two different devices are different, the blueprint will be adjusted for that platform so that the layout is correct across both devices.

Figure 20C:
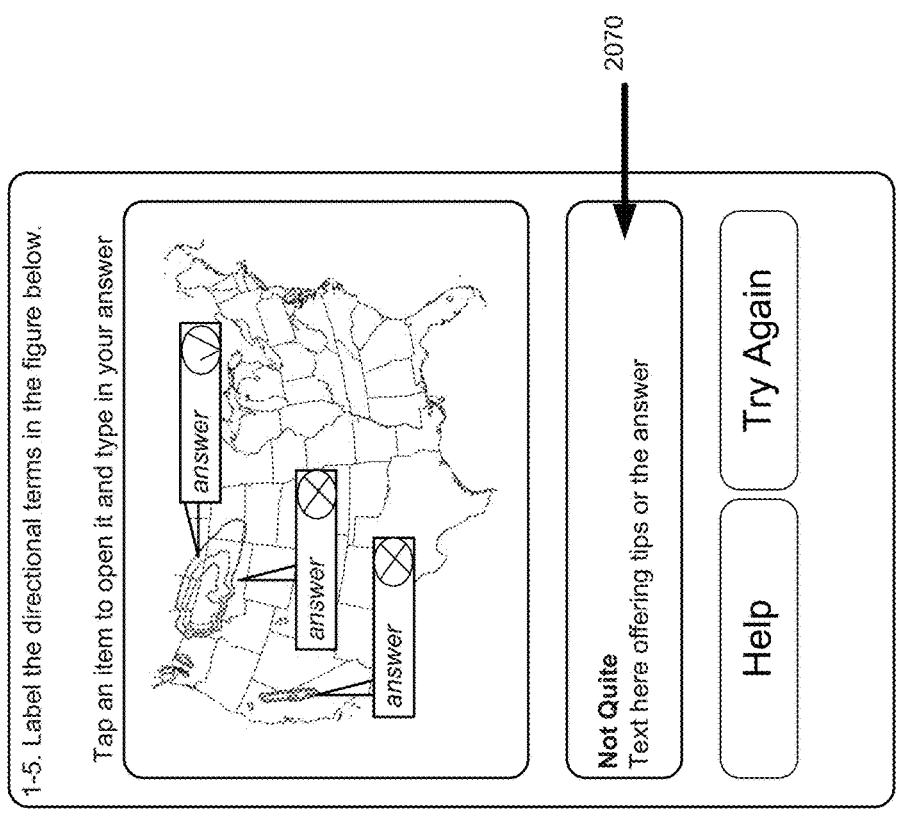
FIG. 20c shows a fill in assessment according to some examples of the present disclosure.

A fill-in assessment displays an image with interactive data points that a user is asked to identify. This blueprint emulates the guided tour blueprint in that it displays a single large image except the user is quizzed on the various annotations in the image. When a user clicks on the pop-tip, a blank text box is displayed where the user types the answer. The blueprint then checks the typed answer against the correct answer and determines whether the user was correct or wrong. One example of a fill-in assessment is shown in FIG. 20*a*-20*c*. Question 2010 is presented to the user along with image 2020 and pop-tips 2030 (A-C). Clicking or tapping on poptips 2030 pops up a text box 2040 for the user to type the answer. Once the user is done filling in the various answers, the user may select the check answer button 2050. Help button 2060 may either provide interface help to describe how to fill in the assessment, or may provide context help to help the user with the questions by giving answer hints. A feedback area is shown 2070 (FIG. 20*c*) when the user selects the check answer button 2050 to provide feedback on what the user did right and wrong. Feedback area 2070 in some examples may include text, graphics, audio, video, audio-video, or any other content presentation item. Like the guided tour blueprint, the fill-in blueprint may be platform agnostic as already explained, however the media and the blueprint may be adjusted by the interaction service to adjust for different device characteristics. Thus, for example, even if the images on two different devices are of different sizes, the blueprint will be adjusted for that platform so that the region of interest is always included in what is rendered for the user, and the layout of the text and other elements around and near the image is correct regardless of the shape/size of their display.

Figure 21:
FIG. 21 shows an audio assessment according to some examples of the present disclosure.

The audio assessment plays an audio file in combination with a different assessment type. In the example of FIG. 21, an audio assessment with a matching assessment is shown. The audio may be the question, part of the question, or it may be an answer hint, or part of the answer. The audio assessment blueprint may be platform agnostic as already explained, both the media and the blueprint may be adjusted by the interaction service to adjust for different device characteristics. Thus, for example, the various audio quality parameters such as bit-rate, quality and the like may be adjusted to suit the particular device.

Also shown in FIG. 21 is a question progress bar 21010 which shows a user the progress they are making through a series of assessments or questions. In some examples, the progress bar may be a standard completion % bar showing the user's progress through the assessment. In other examples, each question may be represented along a scale showing completed questions and questions that have not been completed. Various colors and graphics may be used to indicate to a user that a question has not been attempted, has been attempted but the user was wrong, and has been attempted and the user got the correct answer. For example, and as shown in FIG. 13 a checkmark indicates the user got that particular question correct, while an "X" indicates a wrong answer for that question. If there are more assessments than may be represented, a scrollbar may be used so that a user may scroll the progress bar 21010.

Execution Environment and Electronic Reader

The execution environment takes the platform independent digital specification and the media and presents it to the user and allows for user interactions with the presented content. As used herein, the term "present" includes at least the displaying or playing of audio, visual, and audio-visual content. The content includes text, graphics, images, video, sounds as well as the manipulation of and interaction with that content by an end user.

In some examples, the execution environment also connects to the interaction service and requests a web page or listing of available electronic books to download or otherwise authorize. In some examples, this functionality may include an electronic book or media marketplace where such media is available for purchase. The store may include search capabilities, personal recommendations, user ratings, and other features. In some examples, the store may even present a list of the required textbooks for courses a user is enrolled in. Each item may also show related content such as supplements and other learning aids related to the electronic book. In some examples, purchases may be made with credit card, with or without a user opening an account with the store. In other examples, the store accounts may be linked with, or use other accounts, such as an iTunes account run by Apple, Inc., or an Amazon.com account. These accounts may save user purchasing information.

Figure 21A:
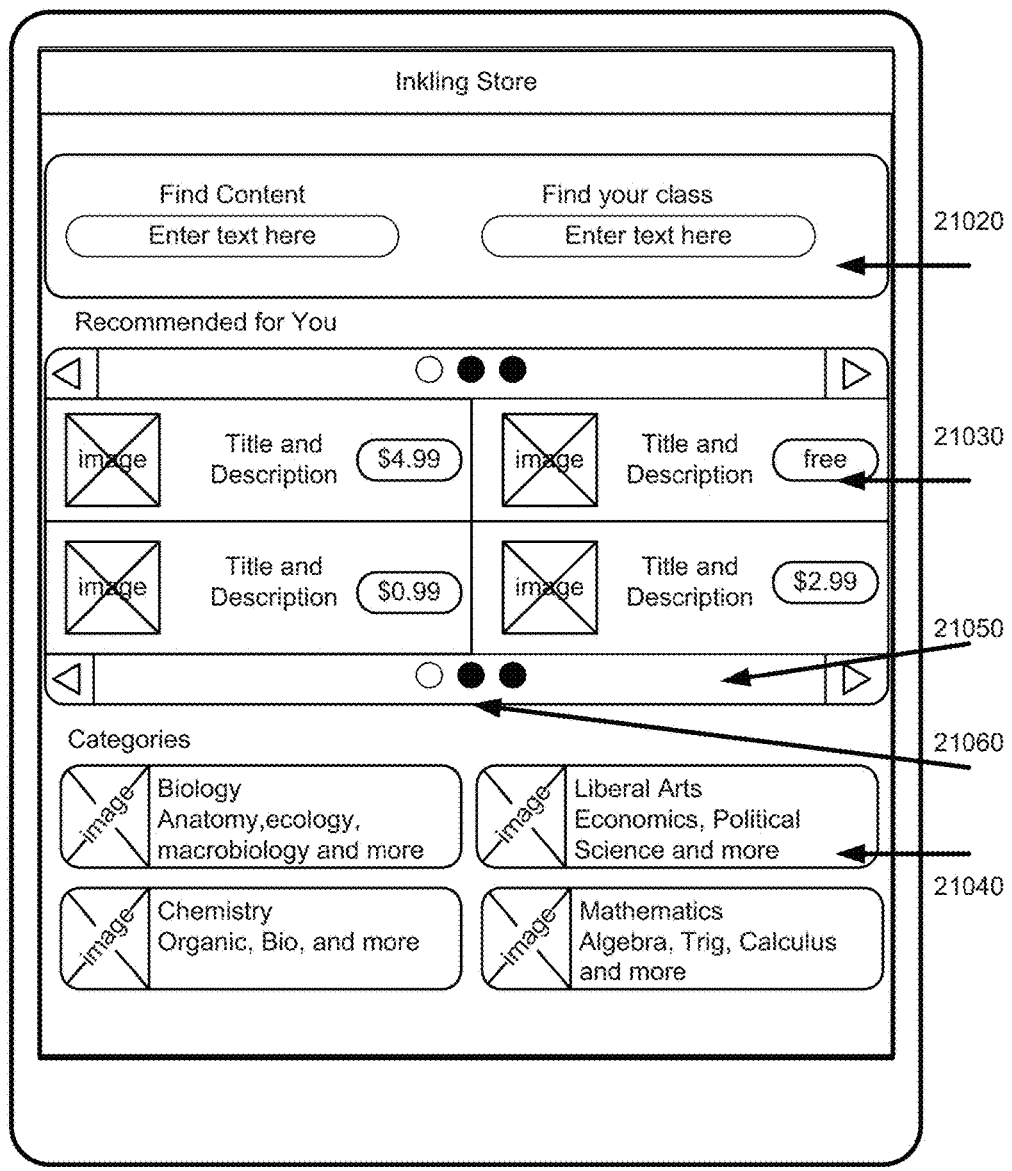
FIG. 21a shows an electronic bookstore according to some examples of the present disclosure.

In some examples, the store may be an online merchant store residing on the interactive service. In other examples, the store may be an application on the electronic reader where the application communicates with the server infrastructure to ascertain the server's current inventory. In still other examples, the store is run by a third party server such as iTunes, or the App store. One example store is shown in FIG. 21a. 21020 shows a header with search boxes. 21030 shows personalized recommendations and 21040 shows various categories of electronic books. Various navigation elements such as scrollbars 21050 and page indicators 21060 are also shown.

Figure 22:
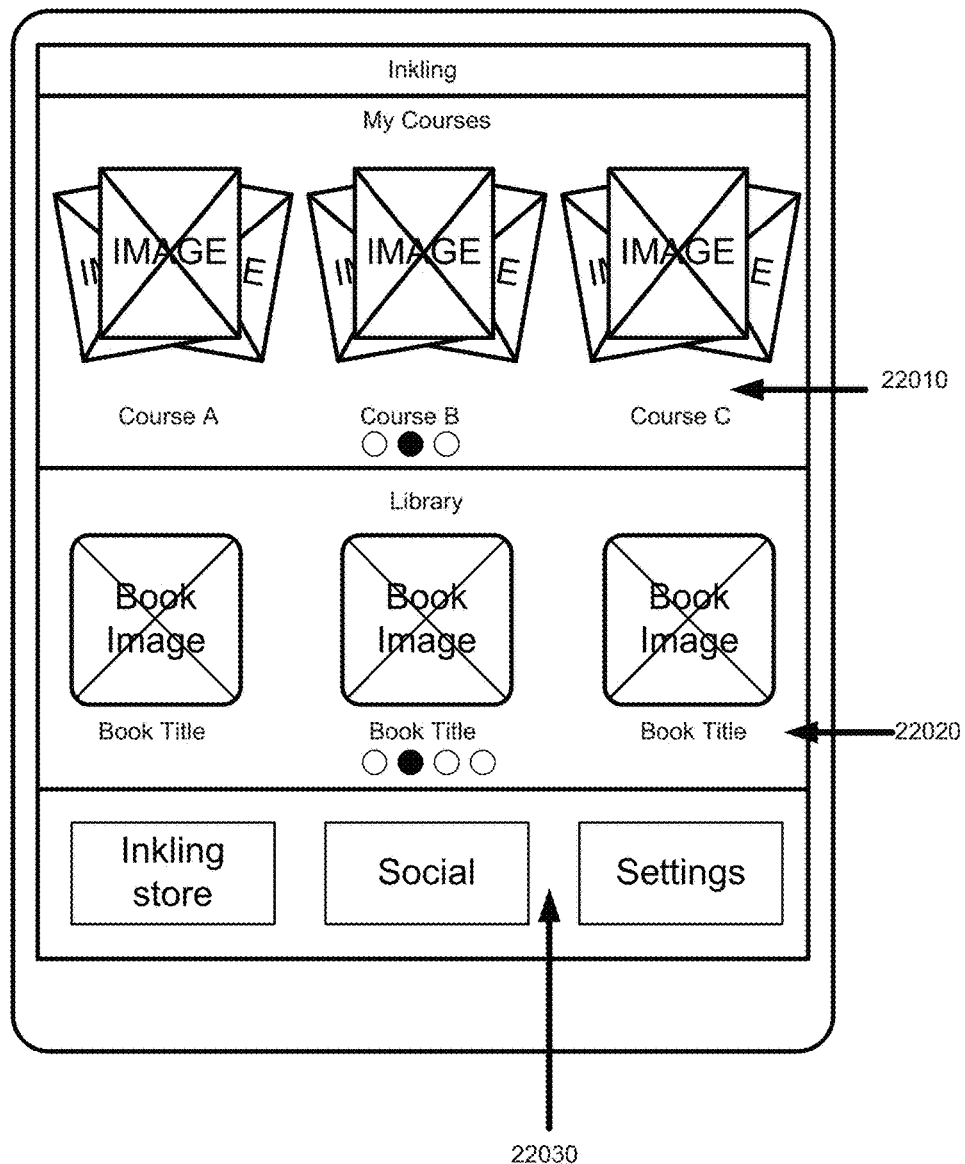
FIG. 22 shows a home screen according to some examples of the present disclosure.
Figure 23:
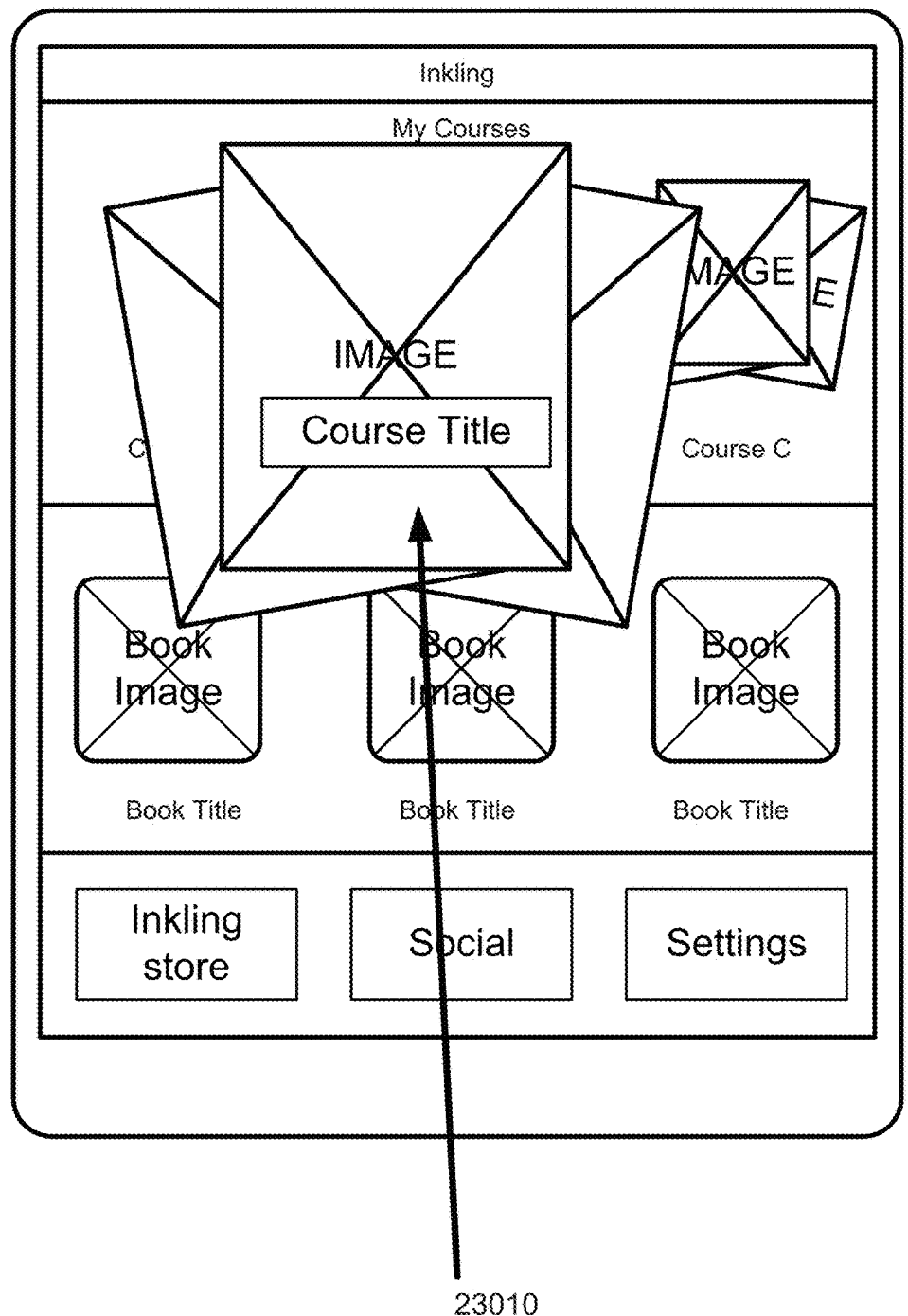
FIG. 23 shows a stack expansion according to some examples of the present disclosure.

In some examples, the execution environment provides the user with a way to organize already purchased media according to courses, topics, or the like. For example, FIG. 22 shows some examples of an execution environment. Reference numeral 22010 identifies 3 dimensional thumbnails of the various "stacks" of cards making up material for various courses the user is enrolled in. Reference numeral 22020 identifies the various books in the user's digital library (i.e. the books the user owns or has access to). The material for the various courses may include the user's current assignments for a particular period. Thus if the user is to read chapter 20 in the electronic book and do certain supplemental problems, the cards for chapter 20 and the supplemental problems will appear on the "stack" in section 22010. 22030 illustrates other user navigation aids to access the bookstore, settings, and various social features. When a course or textbook is selected, various animations may provide feedback to the user on the selection. For example, if one of the various stacks of cards is selected from the course materials section 22010, the stack may graphically "expand" and allow a user to scroll through thumbnail images of the various media in the stack. Thus for example, if the stack includes a portion of an electronic book as well as other supplements, the user may select which media content to view. FIG. 23 illustrates a stack 23010 of course materials which has expanded. A user may swipe left or right to advance to the previous or next item in the stack. Tapping on the screen may select a particular item. In some examples, certain gestures may allow users to "peek" or zoom in on a particular thumbnail to look at various items of content. Other examples allow a user to swipe there finger across the screen to display additional screens of information.

Figure 24:
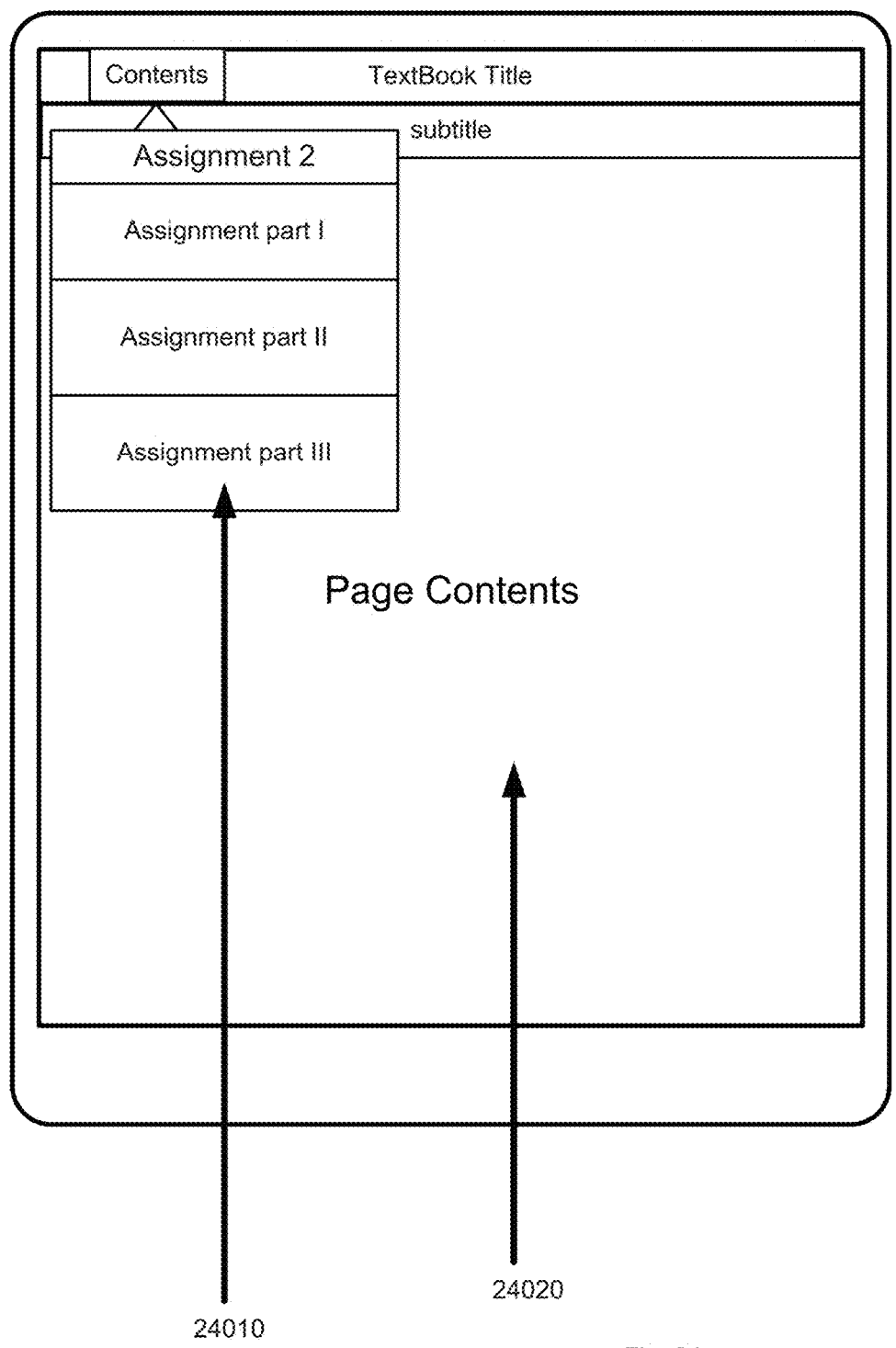
FIG. 24 shows an assignment navigation according to some examples of the present disclosure.
Figure 25:
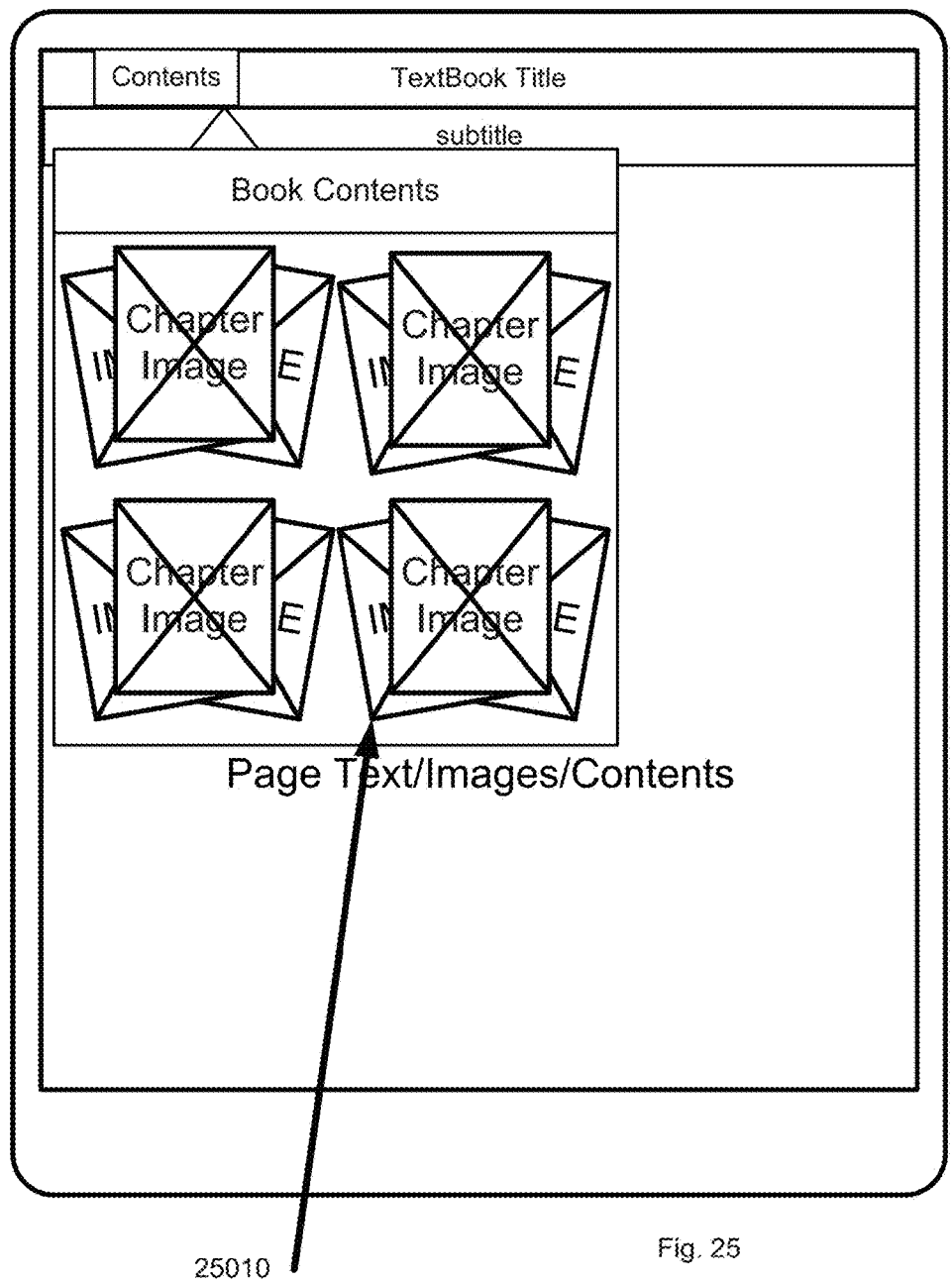
FIG. 25 shows another navigation type according to some examples of the present disclosure.

Within an electronic book, the execution environment presents the user with various navigation aids. In some examples, the electronic book allows users to view thumbnail images from various sections of the electronic book. In other examples, the execution environment allows the user to view the titles from various sections of the book. In other examples, the electronic book presents a "virtual spine," which allows a user to see their relative location in the electronic book. In other examples, the electronic book may provide a navigation aid to show a user his or her assignments for the course in a drop down box. This allows a user to quickly jump to other assignment cards in the stack. FIG. 24 shows some examples of an assignment navigation 24010 displayed over a reader card 24020. FIG. 25 shows some examples of thumbnail navigation 25010 of book sections including chapters, sections, and the like.

In some examples, the execution environment receives and processes input from the user and changes the content presentation in a predefined manner. In some examples the user input includes touches, gestures, keyboard inputs, mouse inputs, trackball inputs, accelerometer or other motion inputs, speech inputs, and the like. Gestures are short, directional movements made by a finger, hand, stylus or other object to make a short, directional movement over a control or object on the screen. In some example, a user is allowed to take and share with other users notes relating to various portions of the book. In other examples, a user may easily navigate through a series or "stack" of cards by flipping or scrolling through a column view.

Figure 26:
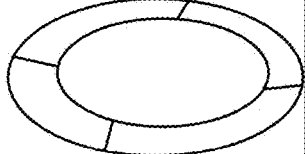
FIG. 26 is an interface diagram showing a user-interface of a notebook according to some examples of the present disclosure.

In some examples, the execution environment allows a user to select various content and incorporate that content into a separate notebook section. The notebook may be automatically sorted based on the portion of the book the content was copied from (i.e. by chapter, section, etc . . . ), or may be organized based on order. Notebooks may be shared across users. In some examples, the execution environment may generate automatic flashcards from the notebook, or otherwise include assessments relating to the selected content. In other examples, the notebook may include text, graphics, or other content presentation items found or entered by users outside the electronic book. One example notes section 26010 is shown in FIG. 26.

Figure 27:
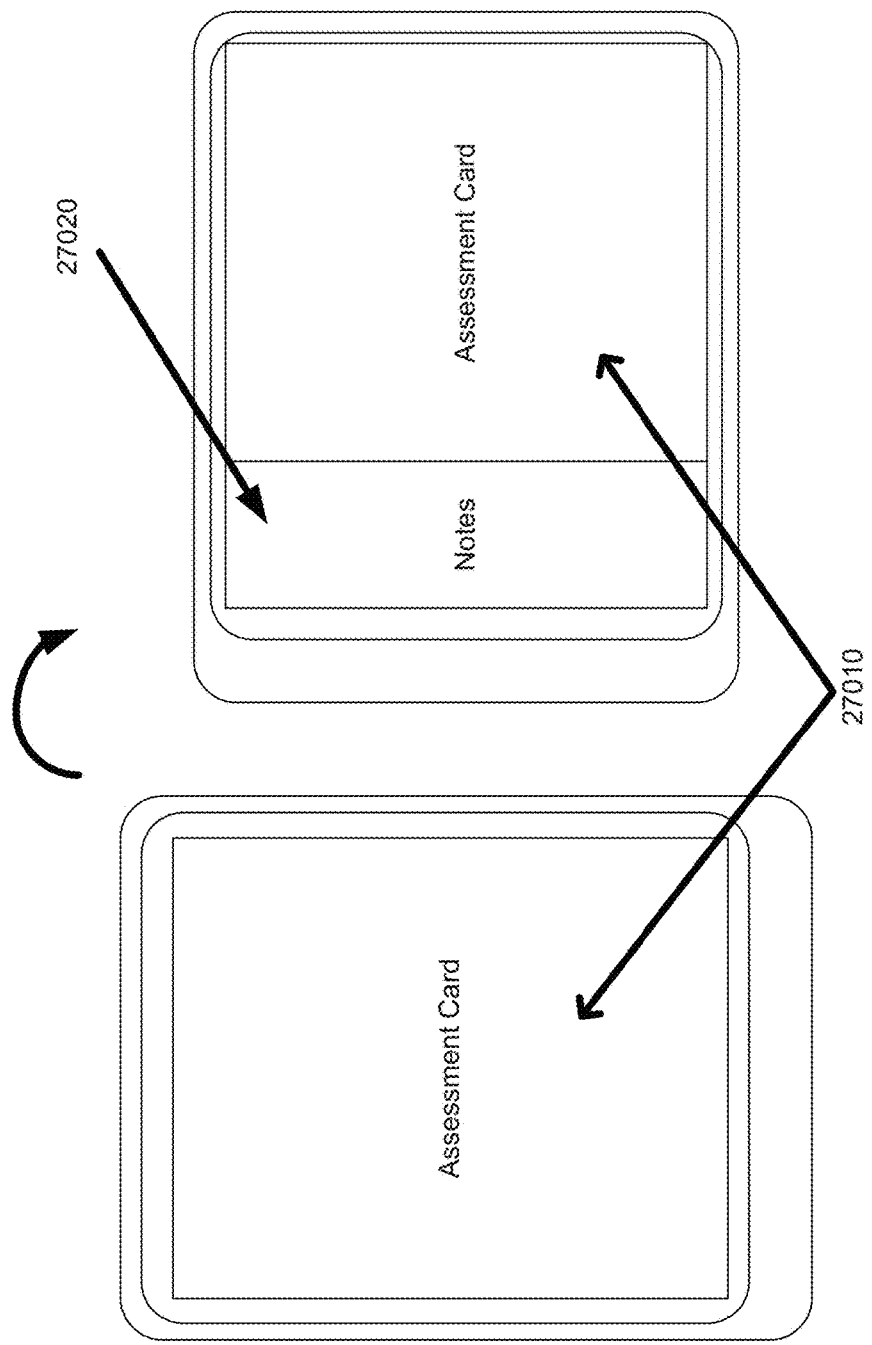
FIG. 27 shows the use of user notes in an assessment according to some examples of the present disclosure.

In yet other examples, the notes functionality may be integrated into the interactive assessments. For example, the system may automatically track and associate particular notes with particular content. Thus the system may associate notes taken by users with the interactive content presentation object or objects that are being viewed at or near that time. As stated before, certain assessments contain a "hint" button that offers users hints. The system may then use the notes associated with the interactive content presentation object or objects that are the subject of the assessment to provide the "hints." In some other examples, after a user gets a wrong answer, the user may call up his or her notes by performing some action. One example of this is shown in FIG. 27 where a user may rotate the electronic reader to show the notes 27020 while taking assessment 27010.

Figure 28:
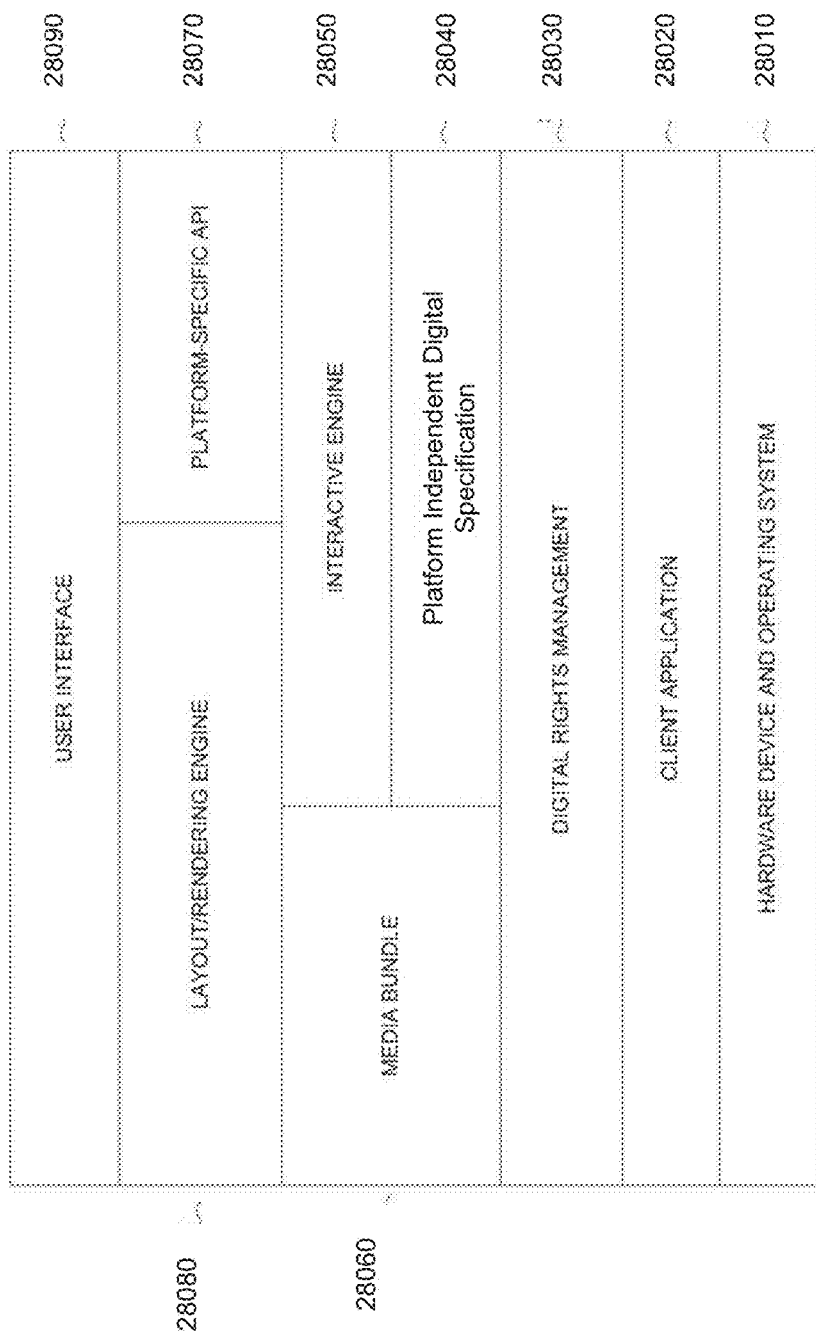
FIG. 28 is a block diagram illustrating an execution environment according to some examples of the present disclosure.

FIG. 28 shows some examples system 28000 for an execution environment. In FIG. 28, hardware device and operating system 28010 is shown. Hardware device and operating system 28010 will likely be dependent on the particular type of electronic reading device. The hardware and operating system layer provide the functions required to run application software, including the processor, system memory, storage, network interface, TCP/IP stack or other protocol stack, and application programming interfaces for the development of software applications. The hardware device and operating system may be of any variation including traditional PC-based operating systems, mobile device operating systems or network-based operating systems that abstract the hardware layer from the application programming interface. Some examples include Microsoft Windows, developed by Microsoft, Corp., Redmond Wash., UNIX, LINUX, iOS™, MacOS™, ANDROID™, and the like.

Client application 28020 represents the user-level executable the user launches on the client device in order to access the electronic book. In some embodiments, all functions of FIG. 28 may be inside the client application. In other examples, only selected portions are encapsulated in client application 28020.

In some examples, digital rights management process 28030 or "DRM" process authorizes and authenticates a particular user or device in order to allow the user to access appropriate media from the electronic book. DRM may authorize an entire book, or selected portions thereof. DRM also prevents the user and device from accessing electronic books or segments thereof that the user is not authorized to access. In some examples, DRM may also be configured to prevent a user or system from extracting text, images, video or other protected assets, and transmitting those assets to another device or writing them out to disk for later retrieval or sharing.

Platform independent digital specification 28040 provides a platform-agnostic representation of all content and metadata for that content. Metadata may include basic information such as the date content was created, the version number, and where the content should appear in the context of its bundle. Metadata may also include descriptions of interactive behavior, such as, for example, where audio annotations would be anchored on an image when it rendered in the system, or how an image might be positioned initially on the screen when a user opens it.

Interactive engine 28050 is configured to interpret the intermediate platform independent digital specification and read data from the media bundle 28060, providing it in a platform-specific representation to the layout/rendering engine 28080 and the platform specific API 28070. The interactive engine may be configured to also handle events such as multi-finger touch inputs to determine the appropriate behavior of the object on screen. Platform specific API 28070 is configured to accept data from the interactive engine 28050 and media bundle 28060 and determine the appropriate objects to instantiate in order to display the content to the user. The layout/rendering engine 28080 works in parallel with the platform specific API 28070 to render that content to the display. The user interface 28090 is a collection of canonical visual elements that provide the user with known results to input behaviors. For example, the user interface 28090 may be configured to render a small "sticky note" that shows that a given location in a document and has an annotation attached.

The execution environment runs on an electronic reader. In some examples, the electronic reader may be an IPAD manufactured by APPLE COMPUTER INC. of Cupertino Calif., or another tablet computer or electronic reader such as a Nook, manufactured by BARNES AND NOBLE INC. of New York, N.Y. or Kindle manufactured by AMAZON.COM of Seattle Wash. In some other examples, the electronic reader may be a laptop or desktop computer. In other examples, the electronic reader may be a cellphone or smartphone such as the APPLE IPHONE™ manufactured by APPLE COMPUTER INC., of Cupertino Calif. The electronic reader may be any device with a display, an input mechanism, a processor, and electronic storage.

Figure 29:
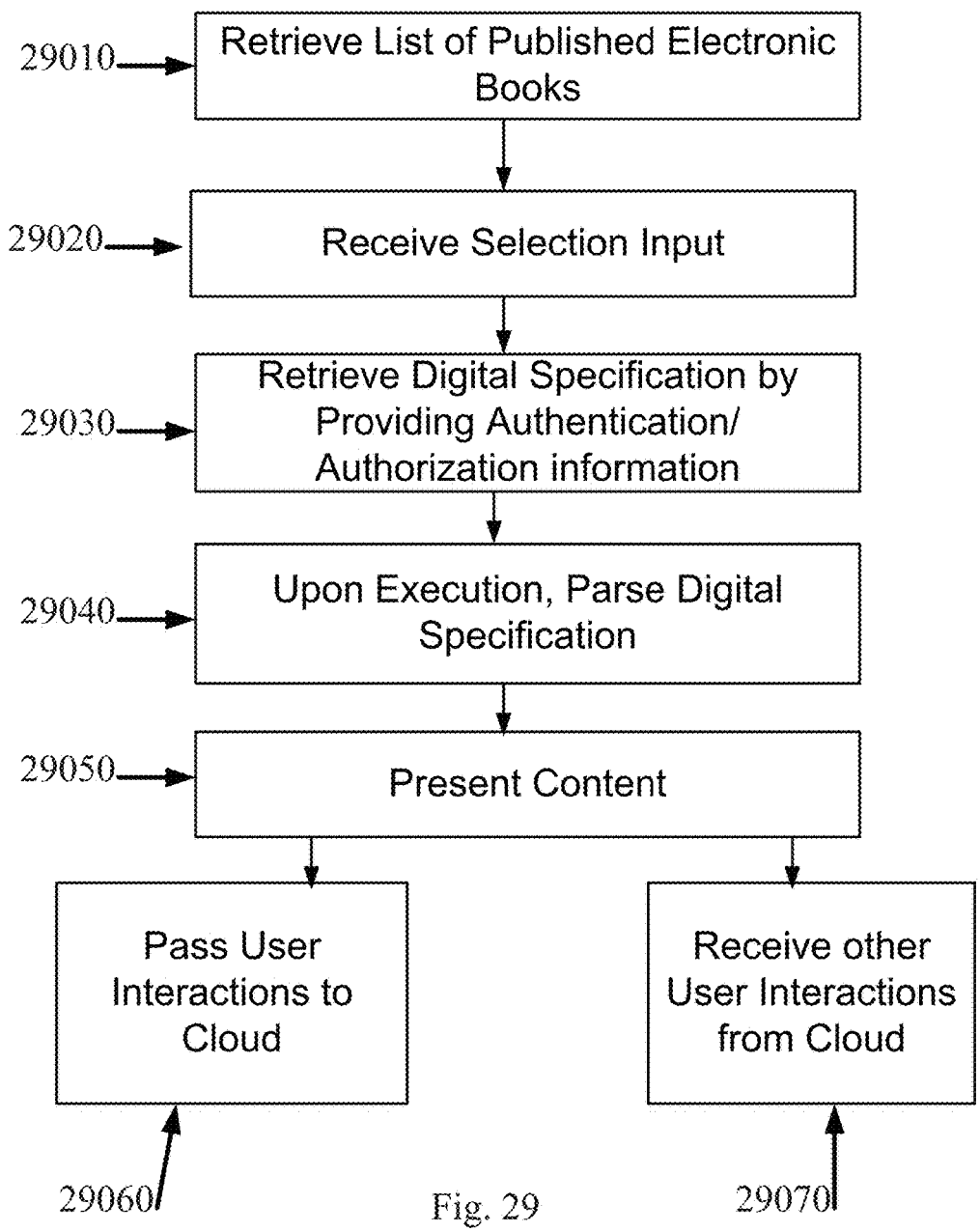
FIG. 29 is a flow chart showing an example method of the execution environment according to some examples of the present disclosure.

FIG. 29 shows an example method of execution of an electronic reader. In operation 29010 the electronic reader retrieves a list or web page with a list of published electronic books and presents that list or web page to a user. In 29020, in response to a selection input, the reader retrieves the electronic book by authentication. When the user executes the electronic book 29030, the platform independent digital specification is parsed and the contents presented 29040. Any user interactions that are social in nature are passed to the interaction service 29050, and the reader presents to the user any interactions passed from the interaction service 29060. As used herein, the term "published," or "publication," simply refers to the availability of a particular electronic book to users of electronic reading devices.

Figure 30:
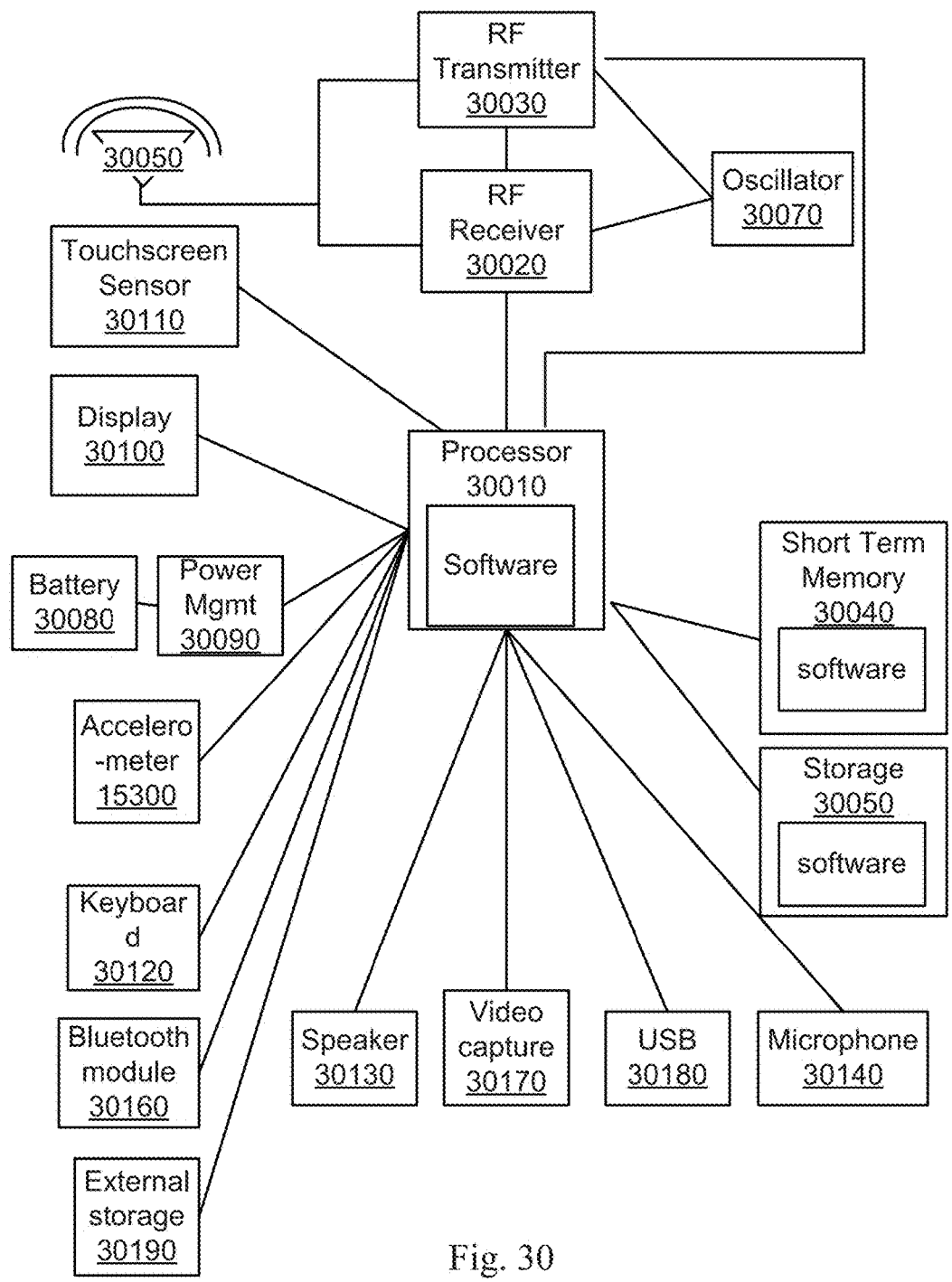
FIG. 30 shows a block diagram of an example electronic reader according to some examples of the present disclosure.

FIG. 30 shows some examples of such a device 30000 in the form of a tablet computer. Processor 30010 controls the overall functions of the tablet such as running applications and controlling peripherals. Processor 30010 may be any type of processor including RISC, CISC, VLIW, MISC, OISC, and the like. Processor 30010 may include a Digital Signal Processor ("DSP"). Processor 30010 may communicate with RF receiver 30020 and RF transmitter 30030 to transmit and receive wireless signals such as cellular, Bluetooth, and WiFi signals. Processor 30010 may use short term memory 30040 to store operating instructions and help in the execution of the operating instructions such as the temporary storage of calculations and the like. Processor 30010 may also use non-transitory storage 30050 to read instructions, files, and other data that requires long term, non-volatile storage.

RF Receiver 30020 and RF Transmitter 30030 may send signals to the antenna 30050 of display 30060. RF transmitter 30030 contains all the necessary functionality for transmitting radio frequency signals via, antenna 30050 given a baseband signal sent from Processor 30010. RF transmitter may contain an amplifier to amplify signals before supplying the signal to integrated antenna 30050. RF transmitter 30030 and RF Receiver 30020 are capable of transmitting and receiving radio frequency signals of any frequency including, microwave frequency bands (0.3 to 300 GHz) which include cellular telecommunications, WLAN and WWAN frequencies. Oscillator 30070 may provide a frequency pulse to both RF Receiver 30030 and RF Transmitter 30020.

Device 30000 may include a battery or other power source 30080 with associated power management process or module 30090. Power management module 30090 distributes power from the battery 30080 to the other various components. Power management module 30090 may also convert the power from battery 30080 to match the needs of the various components. Power may also be derived from alternating or direct current supplied from a power network.

Processor 30010 may communicate and control other peripherals, such as LCD display 30100 with associated touch screen sensor 30110. Processor 30010 causes images to be displayed on LCD display 30100 and receives input from the touch screen sensor 30110 when a user presses on the touch-screen display. In some examples touch screen sensor 30110 may be a multi-touch sensor capable of distinguishing, and processing gestures.

Processor 30010 may receive input from a physical keyboard 30120. Processor 30010 may produce audio output, and other alerts which are played on the speaker 30130. Speaker 30130 may also be used to play voices (in the case of a voice phone call) that have been received from RF receiver 30020 and been decoded by Processor 30010. Microphone 30140 is used to transmit a voice for a voice call conversation to Processor 30010 for subsequent encoding and transmission using RF Transmitter 30030. Microphone 30140 may also be used as an input device for commands using voice processing software. Accelerometer 30300 provides input on the motion of the device 30000 to processor 30010. Accelerometer 30300 may be used in motion sensitive applications. Bluetooth module 30160 may be used to communicate with Bluetooth enabled external devices. Video capture device 30170 may be a still or moving picture image capture device or both. Video Capture device 30170 is controlled by Processor 30010 and may take and store photos, videos, and may be used in conjunction with microphone 30140 to capture audio along with video. USB port 30180 enables external connections to other devices supporting the USB standard and charging capabilities. USB port 30180 may include all the functionality to connect to, and establish a connection with an external device over USB. External storage module 30190 may include any form of removable physical storage media such as a flash drive, micro SD card, SD card, Memory Stick and the like. External storage module 30190 may include all the functionality needed to interface with these media.

The Infrastructure

Interactive Service 1010 in some examples includes data storage, authentication and authorization services, social networking services, content ingestion, listing and publishing services and bundling services. One example interactive service 31000 is shown in FIG. 31.

Figure 31:
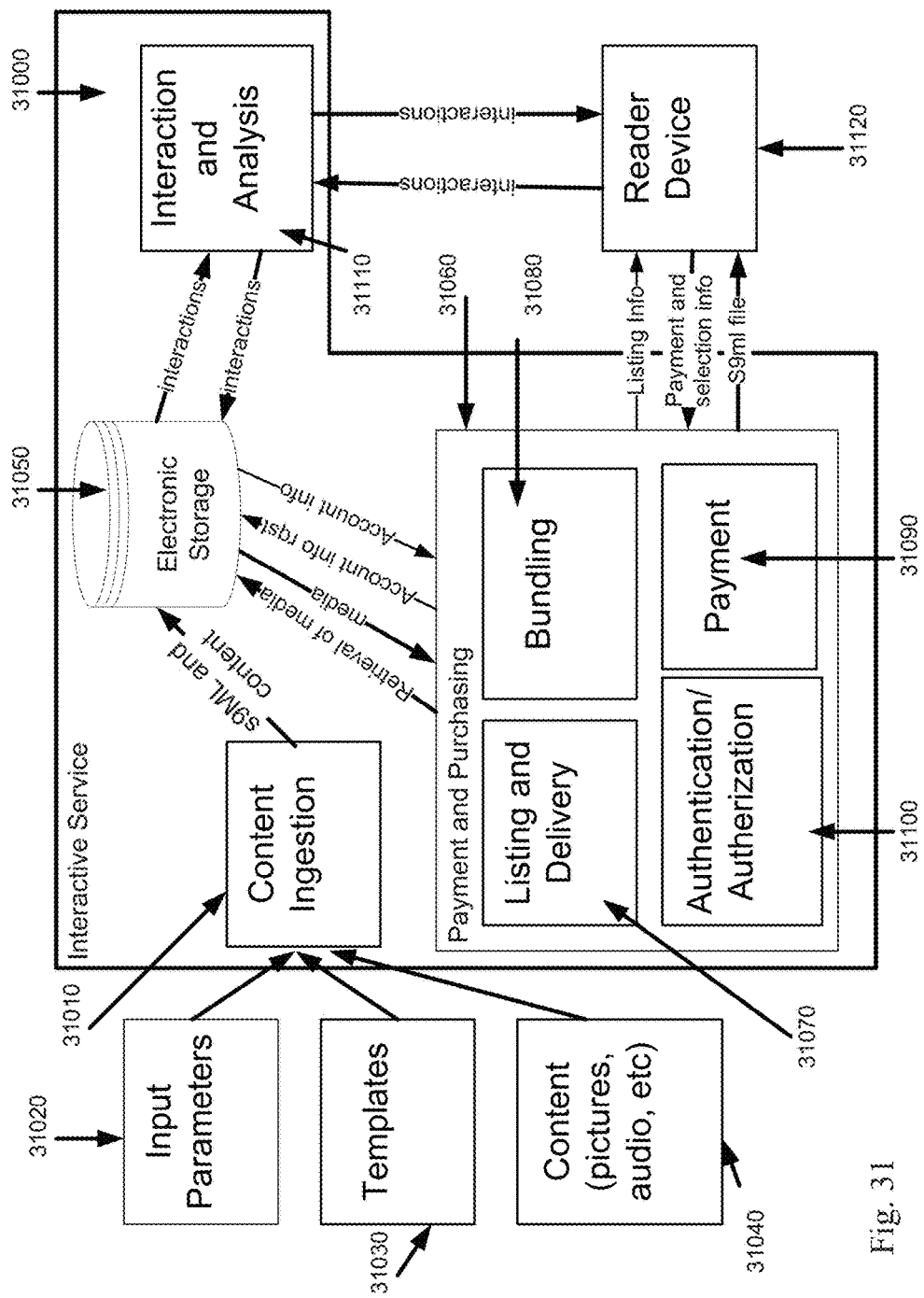
FIG. 31 shows a block diagram of an example interactive service according to some examples of the present disclosure.

In FIG. 31, content ingestion process 31010 takes input parameters 31020, templates 31030 and content 31040 and creates a platform independent digital specification of an electronic book with the interactive content presentation and assessment modules. The platform independent digital specification may be in any format in which an execution environment of an electronic reader may read, interpret, and process in order to display the content presentation items of the electronic book. The platform independent digital specification may also include parameters for the various interactive content presentation objects that tell the execution environment how to handle user interaction. In some examples, the platform independent digital representation is an s9ML file which in some examples may be an xml, html, or other markup language file according to a defined structure.

Content ingestion process 31010 then stores the generated platform independent digital specification in electronic storage 31050. Electronic storage 31050 may be any electronic storage capable of storing and retrieving the digital specifications and the media. In some examples electronic storage 31050 is a separate system such as a network attached storage "NAS" or storage area network "SAN" system.

Payment and Purchasing process 31060 includes all the functions necessary to advertise the availability of a particular electronic book stored in electronic storage to a plurality of reader devices. In some examples, payment and purchasing process 31060 may communicate the availability of titles directly to the electronic readers either by pushing the availability information to the execution environment of the readers (which may have a marketplace application executing) or by allowing the reader to request the information, through, for example, a web interface. Thus in some examples, the payment and purchasing process 31060 may function as a web server and in other examples it may function as a data source for a store application on the reader device 31120 itself. In still other examples, payment and purchasing process 31060 may communicate title availability to a third party web merchant site, such as Amazon, iTunes or the iPhone App Store.

Payment process 31090 may include all the functions necessary to process payments from reader devices. In some examples, this may include credit card processing functions, in other examples, this includes electronic payment interfaces to third party applications such as that of PayPal, run by eBay, Inc. of San Jose Calif. In some examples, payment application may maintain a credit or debit account for the user of the reader device.

Authentication and Authorization 31100 contains all the functions necessary to authenticate a reader device and authorize the reader device to view the requested content. In some examples, the electronic book may contain digital rights management software. In some examples, the authentication and authorization works with the digital rights management of the electronic book or the digital rights management of the electronic reader to authorize the user to access the content. In some examples, the Authentication and Authorization process works with the payment applications to authenticate and authorize the content only after payment is verified or received.

Once the content is paid for, authenticated and authorized, listing and delivery process 31070 delivers, or makes available for delivery, the electronic book or a portion thereof. In some examples, the reader device downloads the platform independent specification file with any other content required (i.e. pictures, audio, video, etc.). In other examples, the file is streamed as the user is viewing the content. In yet other examples, the listing and delivery process 31070 informs a third party content storage facility to deliver, or authorize the delivery of the content.

In some examples, the electronic book and the interactive content presentation items are "tagged," by the chapter, sentence, paragraph, word, or any arbitrary segment. In some examples, users may purchase only certain portions of the electronic book based on this tagging. Dynamic sequencing is discussed in detail in U.S. patent a Ser. No. 12/911,247 entitled "Methods for sequencing electronic media content," to Peter Cho, which is hereby incorporated by reference in its entirety. In other examples, these tags are used to share social content interactions. Bundling application 31080 uses these tags along with information on which portions of the electronic book to send to the reader device to bundle all the proper content together to send it to the reader device 31120, rather than the entire electronic book.

Interaction and analysis process 31110 receives, processes, stores and sends to other reader devices interactions from users. These interactions may include in some examples, user comments relating to a portion of the electronic book, user questions, or any other interactions. In some examples, the interactions may be text, in other examples it may be any combination of text, graphics, photos, html links, or the like. Interactions may also include in some examples, interactive bookmarks to share with other content users a particular user's location in the content. Other interactions may include highlighting—which shares a particular user's highlighting choices with other users. Interaction and analysis process 31110 also receives assessment results from the electronic readers. Interaction and analysis process 31110 may then provide various reports about the test performance of a particular user and about all users who submitted results. These reports may include reports on how well an assessment is designed that is intended for the content designer. For example, if most individuals performed extremely well, it signals that the assessment may have been too easy. Other reports include reports sent to users who have completed assessments showing their results, as well as showing results of other users who have completed the assessments. These reports may be made anonymous so that users may not directly see other user's scores. In some examples, only an average score will be shown, in other examples a ranking may be shown to indicate where a particular user is with respect to other users.

It will be appreciated that the components inside the interactive service 31000 could be implemented as separate components, or those components not shown as part of interactive service 31000 could be included as part of interactive service 31000. Additionally, the various components could be executing on the same hardware, or on different hardware connected to each other through a computer network. In some examples this computer network may include LAN, WAN, the Internet, WiFi, Wi-Max, Cellular, and any other method of data transmission. In some other examples, different hardware components may be connected through local connections such as fiber, Ethernet, serial, parallel, PS2, USB, wireless, infra-red, firewire or the like. Electronic reading devices 31120 may communicate with the interactive service through direct connections such as USB, Ethernet, serial, parallel, PS2, USB, wireless, infra-red, firewire or the like. In other examples, electronic reading devices 31120 may communicate with the interactive service through a computer network. In some examples, the reader devices access the computer network through wired connections such as USB, Ethernet, firewire, or the like, but in other examples, the reader devices may access the computer network through wireless means such as Wi-Fi, Bluetooth™, satellite, cellular data communications including but not limited to analog, digital, 2nd Generation (2G) systems such as Integrated Digital Enhanced Network ("iDEN"), Global System for Mobile Communications ("GSM"), 2.5G systems such as General Packet Radio Service ("GPRS"), 2.75G systems such as Enhanced Data Rates for GSM Evolution ("EDGE"), 3G systems such as Universal Mobile Telecommunications System ("UMTS"), and 4G Systems such as the Worldwide Interoperability for Microwave Access ("WiMAX"), and Long Term Evolution ("LTE") systems, and the like.

While the digital specification and the media (such as the pictures, graphics, etc. that are described by the digital specification) are sent unchanged in some examples to the reader device 31120, in other examples, minor modifications are made depending on the device type. This is because there may be little benefit in sending a high-resolution image to a reader device that is a cellphone which is incapable of rendering such a high resolution image. Thus to better put the electronic book in a form ready for presentation, the interactive service may modify the content according to the target reader device 31120.

Figure 32:
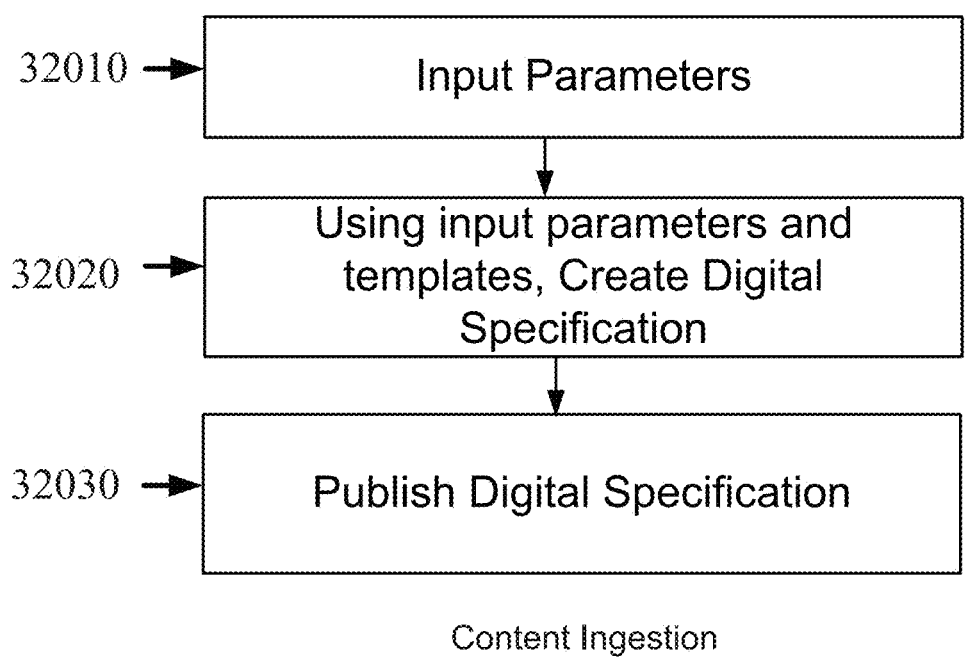
FIG. 32 shows an example content ingestion method according to some examples of the present disclosure.

FIG. 32 shows some examples method for creating a platform independent digital representation or specification of an electronic book. In operation 32010, the content ingestion module 31010 receives input parameters 31020 from an electronic book author who works from a series of content templates or blueprints. Content templates 31030, or blueprints, consist of a number of standardized content presentation formats, or shells, which authors use as a basis for producing the various pieces of their content. The input parameters include the text and other customizations to the content templates that results in the author's creation. Thus, for example, the input parameters may include the actual text of the electronic book. In operation 32020, the content ingestion module creates the platform independent digital specification. In operation 32030, the digital specification is published to allow users to access the content.

Figure 33:
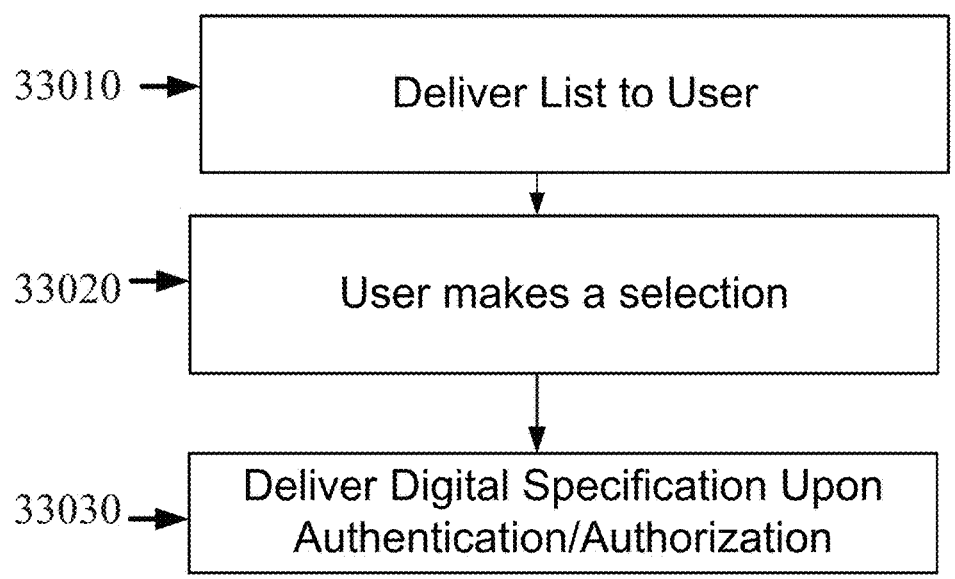
FIG. 33 shows an example content delivery method according to some examples of the present disclosure.

FIG. 33 shows some examples method for content delivery. In operation 33010 the published list of electronic books is delivered to a reading device 31120. In operation 33020, the user makes a selection on the reading device. In operation 33030, the digital specification is delivered to the user upon successful authentication and/or authorization. In some examples, delivery may be by downloaded to the electronic reading device. In some examples, a user may have an account with the interactive service. The electronic book (or portion thereof) may then be associated with that account such that the electronic book may be accessible to a user from a variety of electronic reading devices. A user may log-in to his or her account on the electronic reading device and access the user's electronic books. In some examples, a user may recover content that was accidently deleted through re-downloading the file using their user account.

Figure 34:
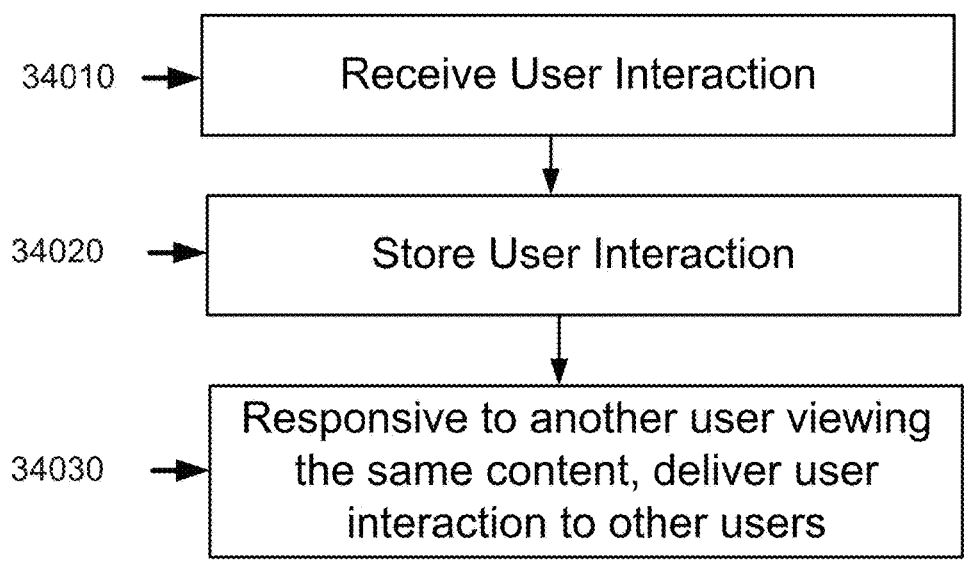
FIG. 34 shows an example user interaction method according to some examples of the present disclosure.

FIG. 34 shows an example user interaction method. In operation 34010 the interaction service receives a user interaction from a reading device. In operation 34020 the user interaction, or a part of the user interaction is stored. In operation 34030, the system sends at least a portion of the user interaction to another reading device. In some examples the other reading device "pulls" or fetches the user interactions. This may be done at regular intervals, or based on a notice sent from the interaction service. In other examples, the interactions are pushed to the reader devices. In some examples, the interactions are selectively delivered. Thus, for example, a user may wish to share the interaction only with certain other users, such as friends or family, but not the class as a whole. In some examples, the interactions are shared across all users viewing the content, but in other examples, it is restricted to a particular class, school, geographical location, or any other criteria. The interaction service in some examples may filter interactions. This is to avoid inappropriate interactions such as spam, harassment of other users, and other undesired behavior. Spam is a term meaning an unsolicited, often commercial message. Filters may be for both quantity—i.e. prevent someone from flooding the service or other users with interactions, and for quality, such that inappropriate comments or remarks are not broadcast to other users. In some other examples, certain devices may be "blacklisted," such that interactions from certain users are not delivered to other users who wish not to receive those user's interactions. In some examples, a user may chose not to view an interaction, or any interactions. In some examples, interactions may include heat maps, a display of the content, especially text, showing the degree to which a given line or block of content is interacted with by marking the most commonly interacted with content with a red bar, and less commonly marked content with a yellow or green bar, and rarely commented text left unmarked. This acts as a proxy for "what's important" in the text or other content. This may be used by other users as a signal on what is important and what might not be important, but also may be used by content designers to understand which portions may be difficult for students or what may be important or interesting to students. In other examples, content creators may be given a report of the number, type and content of interactions such as notes, comments, questions, etc. . . . in order to develop a better electronic book.

Since the electronic reading devices may not always be connected to the interactive service through a network such as the internet, in some examples, the interactive service will need to temporarily store the interactions destined for a particular reader device if that reader device is not connected to the interactive service. Once the particular reader connects to the service, the interactions may then be delivered.

In group learning settings, such as a K-12 classroom, higher education institution, distance learning classroom, corporate training classes or other types of organized course settings, educators may wish to see aggregated data about how users of the content are spending their time, how they are performing on assessment, and the like. In some examples, the system will present user-specific data to the instructor. In other examples, the instructor sees aggregate data for a group of users, such as the percentage of users who have completed a specific reading or assignment. The system may aggregate such user data across any devices or platforms used to access the system.

Example Machine Implementation

Figure 35:
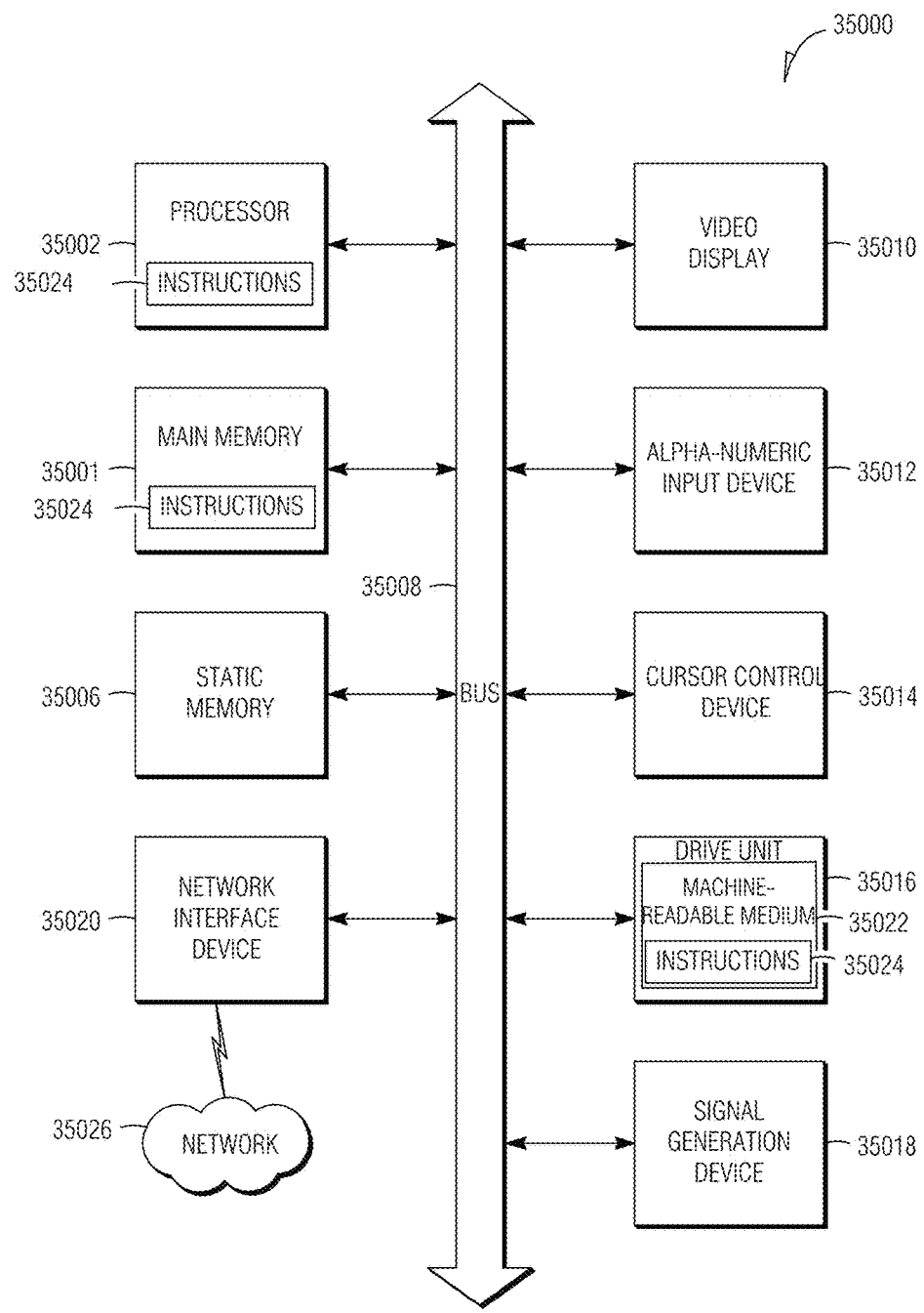
FIG. 35 shows an example computing system according to some examples of the present disclosure.

FIG. 35 shows a diagrammatic representation of a machine in the example form of a computer system 35000 within which a set of instructions for causing the machine to perform any one or more of the methods, processes, operations, or methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments may also be practiced in distributed system environments where local and remote computer systems which that are linked (e.g., either by hardwired, wireless, or a combination of hardwired and wireless connections) through a network, both perform tasks. In a distributed system environment, program modules may be located in both local and remote memory-storage devices (see below).

The example computer system 35000 includes a processor 35002 (e.g., a Central Processing Unit (CPU), a Graphics Processing Unit (GPU) or both), a main memory 35001 and a static memory 35006, which communicate with each other via a bus 35008. The computer system 35000 may further include a video display unit 35010 (e.g., a Liquid Crystal Display (LCD) or a Cathode Ray Tube (CRT)). The computer system 35000 also includes an alphanumeric input device 35012 (e.g., a keyboard), a User Interface (UI) cursor controller 35014 (e.g., a mouse), a disk drive unit 35016, a signal generation device 35018 (e.g., a speaker) and a network interface device 35020 (e.g., a transmitter).

The disk drive unit 35016 includes a machine-readable medium 35022 on which is stored one or more sets of instructions 35024 and data structures (e.g., software) embodying or used by any one or more of the methodologies or functions illustrated herein. The software may also reside, completely or at least partially, within the main memory 35001 and/or within the processor 35002 during execution thereof by the computer system 35000, the main memory 35001 and the processor 35002 also constituting machine-readable media.

The instructions 35024 may further be transmitted or received over a network 35026 via the network interface device 35020 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, and optical and magnetic medium. In some examples the machine-readable medium may be limited to non-transitory machine readable mediums.

Method embodiments illustrated herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, Random Access Memories (RAMs), Read Only Memories (ROMs), and the like.

Additional Notes

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system for electronic learning support, the system comprising:
one or more memories storing instructions and one or more processors that execute the instructions by:
generating a digital specification in a first language from a set of input parameters for one or more of a plurality of digital templates, the digital specification including instructions which when executed by an execution environment of an electronic reading device, cause the electronic reading device to present one or more interactive content presentation objects and one or more interactive assessment objects, the execution environment being one of a plurality of heterogeneous execution environments, each execution environment being specific to one of a plurality of heterogeneous electronic reading devices and having platform-dependent capabilities and user interface elements, and the instructions being such that when executed by each of the heterogeneous execution environments on respective ones of the plurality of heterogeneous electronic reading devices produce a consistent layout within and around the interactive content presentation objects and interactive assessment objects across all of the heterogeneous execution environments on respective ones of the plurality of heterogeneous electronic reading devices;
transmitting the digital specification and pre-processed media data of at least one interactive content presentation object to the electronic reading device wherein the at least one interactive content presentation object is presented with a look and feel of a user interface of the electronic reading device, and wherein the media data is pre-processed to adjust for the platform-dependent capabilities of the execution environment and to ensure the consistent layout within and around the at least one interactive content presentation object; and
receiving content interaction data corresponding to user interactions with the interactive content presentation objects from the execution environment and sending at least a subset of the content interaction data to at least one other electronic reading device; and
receiving assessment data corresponding to user interactions with the interactive assessment objects from the execution environment.

2. The system of claim 1, wherein:
the assessment data comprises interactive test results associated with the one or more interactive assessment objects.

3. The system of claim 1, further comprising:
an interactive assessment analysis module to process the assessment data and to generate a report related to the assessment data.

4. The system of claim 3, wherein:
subsequent to the interactive analysis module generating the report, sending the report to the execution environment of the electronic reading device that sent the assessment data.

5. The system of claim 4, wherein the report includes information relating to a test performance of a user of the electronic reading device that sent the assessment data as well as information relating to a test performance of a further user of a further electronic reading device.

6. The system of claim 3, wherein subsequent to the interactive analysis module generating the report, sending the report to a third party.

7. The system of claim 6, wherein the report includes information relating to a test performance of a user of the electronic reading device that sent the assessment data as well as information relating to a test performance of a further user of a further electronic reading device.

8. The system of claim 1, wherein:
the content interaction data comprises user entered text about the one or more interactive content presentation objects.

9. The system of claim 1, further comprising:
a digital specification storage module configured to store multiple digital specifications;
a listing module configured to generate a listing of at least one of the digital specifications stored in the storage module and to transmit the listing to at least one electronic reading device; and
a purchasing module configured to cause the digital specification delivery module to transmit the digital specification to the electronic reading device upon payment.

10. The system of claim 1, wherein the plurality of heterogeneous reading devices include a tablet computer.

11. The system of claim 1, wherein the plurality of heterogeneous reading devices include a mobile phone.

12. The system of claim 1, wherein the digital specification includes instructions, which when executed by the execution environment, causes the electronic reading device to present an interactive content presentation object comprising a manipulable image object.

13. The system of claim 12, wherein the digital specification includes instructions, which when executed by the execution environment, causes the electronic reading device to allow a user to rotate the manipulable image object.

14. The system of claim 12, wherein the digital specification includes instructions, which when executed by the execution environment, causes the electronic reading device to allow a user to zoom the manipulable image object.

15. The system of claim 12, wherein the digital specification includes instructions, which when executed by the execution environment, causes the electronic reading device to present an interactive content presentation object comprising a manipulable image object and a caption which is related to the manipulable image object.

16. The system of claim 12, wherein the digital specification includes instructions, which when executed by the execution environment, causes the electronic reading device to present an interactive content presentation object comprising a manipulable image object and a poptip, the poptip displayed responsive to a user selection.

17. The system of claim 1, wherein the digital specification includes instructions, which when executed by the execution environment, causes the electronic reading device to present an interactive content presentation object comprising a slideshow object, which comprises a plurality of images in independent displays.

18. The system of claim 1, wherein the digital specification includes instructions, which when executed by the execution environment, causes the electronic reading device to present an interactive content presentation object comprising a guided tour, which comprises an image and allows a user to step through various points in the image.

19. The system of claim 1, wherein the digital specification includes instructions, which when executed by the execution environment, causes the electronic reading device to present an interactive content presentation object comprising a sideline object which comprises a series of static images along a one-dimensional scale.

20. The system of claim 1, wherein the digital specification includes instructions, which when executed by the execution environment, causes the electronic reading device to present an interactive content presentation object comprising a table object, which comprises a series of text segments organized into rows and columns.

21. The system of claim 1, wherein the digital specification includes instructions, which when executed by the execution environment, causes the electronic reading device to present an interactive content presentation object comprising a glossary object, which comprises a definition of one or more words used in other of the content presentation objects.

22. The system of claim 1, wherein the digital specification includes instructions, which when executed by the execution environment, causes the electronic reading device to present an interactive assessment object comprising a multiple choice object, which comprises one or more multiple choice assessments.

23. The system of claim 1, wherein the digital specification includes instructions, which when executed by the execution environment, causes the electronic reading device to present an interactive assessment object comprising a matching object, which comprises at least two categories of interactive objects and allows users to associate items in the at least two categories of interactive objects to each other.

24. The system of claim 1, wherein the digital specification includes instructions, which when executed by the execution environment, causes the electronic reading device to present an interactive assessment object comprising a fill in the blank object, which comprises an image and associated text boxes that allow a user to fill in the text boxes with text associated with a point on the image.

25. The system of claim 1, wherein the digital specification includes instructions, which when executed by the execution environment, causes the electronic reading device to present an interactive assessment object comprising an audio assessment object, which comprises an audio file and a question to a user.

26. The system of claim 1, wherein the digital specification includes instructions, which when executed by the execution environment, causes the electronic reading device to present an interactive assessment object comprising a question progress bar, which comprises an indication to a user of the user's progress through a plurality of other interactive assessment objects.

27. The system of claim 1, wherein the digital specification includes instructions, which when executed by the execution environment, causes the electronic reading device to present an interactive assessment object comprising a re-ordering object, which comprises a series of media objects in an order, and allows the user to re-order the media objects.

28. A method for electronic learning support, the method comprising:
generating, using one or more processors, a digital specification in a first language from a set of input parameters for one or more of a plurality of digital templates, the digital specification including instructions which when executed by an execution environment of an electronic reading device, cause the electronic reading device to present one or more interactive content presentation objects and one or more interactive assessment objects, the execution environment being one of a plurality of heterogeneous execution environments, each execution environment being specific to one of a plurality of heterogeneous electronic reading devices and having platform-dependent capabilities and user interface elements, and the instructions being such that when executed by each of the heterogeneous execution environments on respective ones of the plurality of heterogeneous electronic reading devices produce a consistent layout within and around the interactive content presentation objects and interactive assessment objects across all of the heterogeneous execution environments on respective ones of the plurality of heterogeneous electronic reading devices;

transmitting the digital specification and pre-processed media data of at least one interactive content presentation object to the electronic reading device wherein the at least one interactive content presentation object is presented with a look and feel of a user interface of the electronic reading device to the electronic reading device using a computer processor, and wherein the media data is pre-processed to adjust for the platform-dependent capabilities of the execution environment and to ensure the consistent layout within and around the at least one interactive content presentation object;

receiving content interaction data corresponding to the user interactions with the interactive content presentation objects from the execution environment; and sending at least a subset of the content interaction data to at least one other electronic reading device, and receiving assessment data corresponding to user interactions with the interactive assessment objects from the execution environment.

29. The method of claim 28, wherein receiving assessment data comprises receiving interactive test results associated with the one or more interactive assessment objects.

30. The method of claim 28, further comprising:
processing the assessment data and generating a report related to the assessment data.

31. The method of claim 30, wherein:
subsequent to generating the report, sending the report to the execution environment of the electronic reading device that sent the assessment data.

32. The method of claim 31, wherein generating the report comprises generating a report containing information relating to a test performance of a user of the electronic reading device that sent the assessment data and information relating to a test performance of a further user of a further electronic reading device.

33. The method of claim 30, wherein subsequent to generating the report, sending the report to a third party.

34. The method of claim 33, wherein generating the report comprises generating a report containing information relating to a test performance of a user of the electronic reading device that sent the assessment data and information relating to a test performance of a further user of a further electronic reading device.

35. The method of claim 28, wherein:
receiving content interaction data comprises receiving a user entered text about the one or more interactive content presentation objects.

36. The method of claim 28, further comprising:
storing multiple digital specifications;
generating a listing of at least one of the digital specifications stored and presenting the listing to at least one electronic reading device; and
delivering the digital specification to the electronic reading device upon payment.

37. The method of claim 28, wherein the plurality of heterogeneous reading devices includes a tablet computer.

38. The method of claim 28, wherein generating a digital specification comprises generating instructions, which when executed by the execution environment, causes the electronic reading device to present a manipulable image object.

39. The method of claim 38, wherein generating a digital specification comprises generating instructions, which when executed by the execution environment, causes the electronic reading device to allow a user to rotate a manipulable image object.

40. The method of claim 38, wherein generating a digital specification comprises generating instructions, which when executed by the execution environment, causes the electronic reading device to allow a user to zoom a manipulable image object.

41. The method of claim 38, wherein generating a digital specification comprises generating instructions, which when executed by the execution environment, causes the electronic reading device to present an interactive content presentation object comprising a manipulable image object and a caption which is related to the manipulable image object.

42. The method of claim 38, wherein generating a digital specification comprises generating instructions, which when executed by the execution environment, causes the electronic reading device to present an interactive content presentation object comprising a manipulable image object and a poptip, the poptip displayed responsive to a user selection.

43. The method of claim 28, wherein generating a digital specification comprises generating instructions, which when executed by the execution environment, causes the electronic reading device to present an interactive content presentation object comprising a slideshow object comprising a plurality of images in independent displays.

44. The method of claim 28, wherein generating a digital specification comprises generating instructions, which when executed by the execution environment, causes the electronic reading device to present an interactive content presentation object comprising a guided tour which comprises an image and allows a user to step through various points in the image.

45. The method of claim 28, wherein generating a digital specification comprises generating instructions, which when executed by the execution environment, causes the electronic reading device to present an interactive content presentation object comprising a sideline object which presents a series of static images along a one-dimensional scale.

46. The method of claim 28, wherein generating a digital specification comprises generating instructions, which when executed by the execution environment, causes the electronic reading device to present an interactive content presentation object comprising a table object comprising a series of text segments organized into rows and columns.

47. The method of claim 28, wherein generating a digital specification comprises generating instructions, which when executed by the execution environment, causes the electronic reading device to present an interactive content presentation object comprising a glossary object comprising a definition of one or more words used in other of the content presentation objects.

48. The method of claim 28, wherein generating a digital specification comprises generating instructions, which when executed by the execution environment, causes the electronic reading device to present an interactive assessment object comprising one or more multiple choice assessments.

49. The method of claim 28, wherein generating a digital specification comprises generating instructions, which when executed by the execution environment, causes the electronic reading device to present an interactive assessment object comprising a matching object, which comprises at least two categories of interactive objects and allows users to associate items in the at least two categories of interactive objects to each other.

50. The system of claim 28, wherein generating a digital specification comprises generating instructions, which when executed by the execution environment, causes the electronic reading device to present an interactive assessment object comprising a fill-in-the-blanks object, which comprises an image and associated text boxes that allow a user to fill in the text boxes with text associated with a point on the image.

51. The method of claim 28, wherein generating a digital specification comprises generating instructions, which when executed by the execution environment, causes the electronic reading device to present an interactive assessment object comprising an audio assessment object which comprises an audio file and a question to a user.

52. The method of claim 28, wherein generating a digital specification comprises generating instructions, which when executed by the execution environment, causes the electronic reading device to present an interactive assessment object comprising a question progress bar which comprises an indication to a user of the user's progress through a plurality of other interactive assessment objects.

53. The method of claim 28, wherein generating a digital specification comprises generating instructions, which when executed by the execution environment, causes the electronic reading device to present an interactive assessment object comprising re-ordering objects, which comprises a series of media objects in an order, and allows the user to re-order the media objects.

54. A tangible, non-transitory machine readable storage medium that stores instructions which when performed by a machine, causes the machine to perform operations comprising:
generating, using one or more processors, a digital specification in a first language from a set of input parameters for one or more of a plurality of digital templates, the digital specification including instructions which, when executed by an execution environment of an electronic reading device, cause the electronic reading device to present one or more interactive content presentation objects and one or more interactive assessment objects, the execution environment being one of a plurality of heterogeneous execution environments, each execution environment being specific to one of a plurality of heterogeneous electronic reading devices and having platform-dependent capabilities and user interface elements, and the instructions being such that when executed by each of the heterogeneous execution environments on respective ones of the plurality of heterogeneous electronic reading devices produce a consistent layout within and around the interactive content presentation objects and interactive assessment objects across all of the heterogeneous execution environments on respective ones of the plurality of heterogeneous electronic reading devices;

transmitting the digital specification and pre-processed media data of at least one interactive content presentation object to the electronic reading device wherein the at least one interactive content presentation object is presented with a look and feel of a user interface of the electronic reading device to the electronic reading device, and wherein the media data is pre-processed to adjust for the platform-dependent capabilities of the execution environment and to ensure the consistent layout within and around the at least one interactive content presentation object;
receiving content interaction data corresponding to user interactions with the interactive content presentation objects from the execution environment;
sending at least a subset of the content interaction data to at least one other electronic reading device; and
receiving assessment data corresponding to user interactions with the interactive assessment objects from the execution environment.

55. A method for electronic learning comprising:
retrieving, at a first electronic reading device executing a first execution environment, a digital specification in a first language that is one of a plurality of heterogeneous execution environments, wherein the first execution environment has platform-dependent capabilities and user interface elements, and pre-processed media data of at least one interactive content presentation object for the electronic reading device, wherein the at least one interactive content presentation object is presented with a look and feel of a user interface of the electronic reading device, and wherein the media data is pre-processed to adjust for the platform-dependent capabilities of the execution environment and to ensure a consistent layout within and around the at least one interactive content presentation object across heterogeneous execution environments;
parsing the digital specification, and responsive to instructions contained in the digital specification, presenting in the first execution environment of the first electronic reading device one or more interactive content presentation objects and one or more interactive assessment objects by converting the instructions in the digital specification to a second language which is executed by one or more computer processors of the first electronic reading device;
receiving content interaction data corresponding to user interactions with the interactive content presentation objects and sending the interaction data to an interaction server;
receiving a second content interaction data corresponding to a second user's interactions with the interactive content presentation objects from the interaction server, the second user's interactions having been received at the interaction server from a second electronic reading device executing a second execution environment different from the first execution environment and within which the digital specification was presented with a consistent layout within and around the interactive content presentation objects and interactive assessment objects in comparison to the digital specification in the first execution environment of the first electronic reading device;
presenting, in the first execution environment, the second content interaction data; and
sending to the interaction server, assessment data corresponding to user interactions with the interactive assessment objects.

56. The method of claim 55, wherein:
receiving content interaction data comprises receiving user entered text about the one or more interactive content presentation objects.

57. The method of claim 55, further comprising:
retrieving a listing of a plurality of digital specifications from a server; and
transmitting payment information to the server in response to a user selecting one of the plurality of digital specifications.

58. The method of claim 55, wherein presenting one or more interactive content presentation objects and one or more interactive assessment objects includes presenting a manipulable image object.

59. The method of claim 58, wherein presenting one or more interactive content presentation objects and one or more interactive assessment objects includes allowing a user to rotate the manipulable image object.

60. The method of claim 58, wherein presenting one or more interactive content presentation objects and one or more interactive assessment objects includes allowing a user to zoom the manipulable image object.

61. The method of claim 58, wherein presenting one or more interactive content presentation objects includes presenting a manipulable image object and a caption which is related to the manipulable image object.

62. The method of claim 58, wherein presenting one or more interactive content presentation objects and one or more interactive assessment objects includes presenting a manipulable image object and a poptip, the poptip displayed responsive to a user selection.

63. The method of claim 55, wherein presenting one or more interactive content presentation objects and one or more interactive assessment objects includes presenting a slideshow object, which comprises a plurality of images in independent displays.

64. The method of claim 55, wherein presenting one or more interactive content presentation objects and one or more interactive assessment objects includes presenting a guided tour, which comprises an image and allows a user to step through various points in the image.

65. The method of claim 55, wherein presenting one or more interactive content presentation objects and one or more interactive assessment objects includes presenting a sideline object, which comprises a series of static images along a one-dimensional scale.

66. The method of claim 55, wherein presenting one or more interactive content presentation objects and one or more interactive assessment objects includes presenting a table object, which comprises a series of text segments organized into rows and columns.

67. The method of claim 55, wherein presenting one or more interactive content presentation objects and one or more interactive assessment objects includes presenting a glossary object, which comprises a definition of one or more words used in other of the content presentation objects.

68. The method of claim 55, wherein presenting one or more interactive assessment presentation objects and one or more interactive assessment objects includes presenting one or more multiple choice assessments.

69. The method of claim 55, wherein presenting one or more interactive content presentation objects and one or more interactive assessment objects includes presenting a matching object, which comprises at least two categories of interactive objects and allows users to associate items in the at least two categories of interactive objects to each other.

70. The system of claim 55, wherein presenting one or more interactive content presentation objects and one or more interactive assessment objects includes presenting a fill-in-the-blanks object, which comprises an image and associated text boxes that allow a user to fill in the text boxes with text associated with a point on the image.

71. The method of claim 55, wherein presenting one or more interactive content presentation objects and one or more interactive assessment objects includes presenting an audio assessment object which causes the electronic reading device to play an audio file and presents a question to a user.

72. The method of claim 55, wherein presenting one or more interactive content presentation objects and one or more interactive assessment objects includes presenting an indication to a user of the user's progress through a plurality of other interactive assessment objects.

73. The method of claim 55, wherein presenting one or more interactive content presentation objects and one or more interactive assessment objects includes presenting a re-ordering object, which comprises a series of media objects in an order, and allows the user to re-order the media objects.

74. A system for electronic learning comprising:
one or more memories storing instructions and one or more processors that execute the instructions by:
receiving a digital specification in a first language and pre-processed media data of at least one interactive content presentation object for an electronic reading device having one of a plurality of heterogeneous execution environments, wherein the respective execution environment has platform-dependent capabilities and user interface elements wherein the at least one interactive content presentation object is presented with a look and feel of a user interface of the electronic reading device, and wherein the media data is pre-processed to adjust for the platform-dependent capabilities of the execution environment and to ensure the consistent layout within and around the at least one interactive content presentation object across heterogeneous execution environments;
parsing the digital specification, and responsive to instructions contained in the digital specification, presenting, in a first execution environment, one or more interactive content presentation objects and one or more interactive assessment objects by converting the instructions in the digital specification to a second language which is executed by one or more computer processors;
receiving content interaction data corresponding to user interactions with the interactive content presentation objects and to send the interaction to an interaction server;
receiving a second content interaction data corresponding to user interactions with the interactive content presentation objects from the interaction server, the second content interaction data having been received at the interaction server responsive to second user interactions with the digital specification as rendered in a second execution environment different from the first execution environment and within which the digital specification was presented with a consistent layout within and around the interactive content presentation objects and interactive assessment objects in comparison to the digital specification in the first execution environment, and presenting the second digital interaction; and sending assessment data corresponding to user interactions with the interactive assessment objects from the execution environment.

75. The system of claim 74, wherein:
the received content interaction data comprises a user entered text about the one or more interactive content presentation objects.

76. The system of claim 74, further comprising:
a selection module to retrieve a listing of a plurality of digital specifications from a server; and
a payment module to send payment information to the server in response to a user selecting one of the plurality of digital specifications.

77. The system of claim 74, wherein the one or more interactive content presentation objects and one or more interactive assessment objects includes a manipulable image object.

78. The system of claim 77, wherein the one or more interactive content presentation objects and one or more interactive assessment objects includes a rotatatable manipulable image object.

79. The system of claim 77, wherein the one or more interactive content presentation objects and one or more interactive assessment objects includes a zoomable manipulable image object.

80. The system of claim 77, wherein the one or more interactive content presentation objects includes a manipulable image object and a caption which is related to the manipulable image object.

81. The system of claim 77, wherein the one or more interactive content presentation objects and one or more interactive assessment objects includes a manipulable image object and a poptip, the poptip displayed responsive to a user selection.

82. The system of claim 74, wherein the one or more interactive content presentation objects and one or more interactive assessment objects includes a slideshow object, which comprises a plurality of images in independent displays.

83. The system of claim 74, wherein the one or more interactive content presentation objects and one or more interactive assessment objects includes a guided tour, which comprises an image and allows a user to step through various points in the image.

84. The system of claim 74, wherein the one or more interactive content presentation objects and one or more interactive assessment objects includes a sideline object, which comprises a series of static images along a one-dimensional scale.

85. The system of claim 74, wherein the one or more interactive content presentation objects and one or more interactive assessment objects includes presenting a table object, which comprises a series of text segments organized into rows and columns.

86. The system of claim 74, wherein the one or more interactive content presentation objects and one or more interactive assessment objects includes presenting a glossary object, which comprises a definition of one or more words used in other of the content presentation objects.

87. The system of claim 74, wherein the one or more interactive assessment presentation objects and one or more interactive assessment objects includes a multiple choice object.

88. The system of claim 74, wherein the one or more interactive content presentation objects and one or more interactive assessment objects includes a matching object, which comprises at least two categories of interactive objects and allows users to associate items in the at least two categories of interactive objects to each other.

89. The system of claim 74, wherein the one or more interactive content presentation objects and one or more interactive assessment objects includes a fill-in-the-blanks object, which comprises an image and associated text boxes that allow a user to fill in the text boxes with text associated with a point on the image.

90. The system of claim 74, wherein the one or more interactive content presentation objects and one or more interactive assessment objects includes an audio assessment object, which comprises an audio file and presents a question to a user.

91. The system of claim 74, wherein the one or more interactive content presentation objects and one or more interactive assessment objects includes an indication to a user of the user's progress through a plurality of other interactive assessment objects.

92. The system of claim 74, wherein the one or more interactive content presentation objects and one or more interactive assessment objects includes a re-ordering object, which comprises a series of media objects in an order, and allows the user to re-order the media objects.

\* \* \* \* \*